(12) United States Patent
Nakajima et al.

(10) Patent No.: US 9,086,797 B2
(45) Date of Patent: Jul. 21, 2015

(54) HANDWRITING INPUT DEVICE, AND HANDWRITING INPUT METHOD

(75) Inventors: Kenji Nakajima, Kawasaki (JP); Naomi Iwayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 13/041,871

(22) Filed: Mar. 7, 2011

(65) Prior Publication Data

US 2011/0234516 A1 Sep. 29, 2011

(30) Foreign Application Priority Data

Mar. 26, 2010 (JP) .................................. 2010-72900

(51) Int. Cl.
 *G06F 3/044* (2006.01)
 *G06F 3/0488* (2013.01)
 *G06K 9/00* (2006.01)

(52) U.S. Cl.
 CPC ........ *G06F 3/04883* (2013.01); *G06K 9/00174* (2013.01)

(58) Field of Classification Search
 CPC ..... G06F 3/041; G06F 3/04883; G06F 3/044; G06F 3/0488; G06K 9/00174
 USPC ................................... 345/173; 382/187, 189
 See application file for complete search history.

(56) References Cited

U.S. PATENT DOCUMENTS

| 5,781,122 A * | 7/1998 | Katagiri ....................... 340/7.55 |
| 6,392,675 B1 * | 5/2002 | Becker et al. ................. 715/858 |
| 7,246,321 B2 * | 7/2007 | Bryborn et al. ............... 715/741 |
| 2002/0006214 A1 * | 1/2002 | Karlsson ....................... 382/119 |
| 2006/0087496 A1 * | 4/2006 | Maciejewski ................ 345/173 |
| 2009/0284532 A1 * | 11/2009 | Kerr et al. ..................... 345/442 |

FOREIGN PATENT DOCUMENTS

| JP | 06-266903 | 9/1994 |
| JP | 2007164423 | 6/2007 |

OTHER PUBLICATIONS

Japanese Office Action mailed Sep. 3, 2013 in corresponding Japanese Application No. 2010-072900 (5 pages).

* cited by examiner

*Primary Examiner* — Towfiq Elahi
(74) *Attorney, Agent, or Firm* — Staas & Halsey LLP

(57) ABSTRACT

A handwriting input device accepts an input of a handwriting; and allows a display unit to display a handwriting with a predetermined length from a starting point to a present input point from among handwritings received by the reception unit at a present input point.

15 Claims, 31 Drawing Sheets

FIG. 4

| STROKE NO. (POSITION IN SEQUENCE) | WRITTEN POINT NO. (ORDER OF INPUT) | COORDINATES | DISTANCE FROM LAST POINT |
|---|---|---|---|
| 1 | 0 | x10,y10 | L0 (=0) |
| 1 | 1 | x11,y11 | L1 |
| 1 | 2 | x12,y12 | L2 |
| 1 | 3 | x13,y13 | L3 |
| 1 | 4 | x14,y14 | L4 |
| 1 | 5 | x15,y15 | L5 |
| 1 | 6 | x16,y16 | L6 |
| 2 | 0 | x20,y20 | L7 |
| 2 | 1 | x21,y21 | L8 |
| 2 | 2 | x22,y22 | L9 |
| 2 | 3 | x23,y23 | L10 |
| 2 | 4 | x24,y24 | L11 |
| 3 | ... | ... | ... |
| 3 |  |  |  |
| 3 |  |  |  |

FIG. 13

| STROKE NO. (POSITION IN SEQUENCE) | WRITTEN POINT NO. (ORDER OF INPUT) | COORDINATES | DISTANCE FROM LAST POINT | ERASING START POINT |
|---|---|---|---|---|
| 1 | 0 | x10,y10 | L0 (=0) | |
|  | 1 | x11,y11 | L1 | |
|  | 2 | x12,y12 | L2 | ○ |
|  | 3 | x13,y13 | L3 | |
|  | 4 | x14,y14 | L4 | |
|  | 5 | x15,y15 | L5 | |
|  | 6 | x16,y16 | L6 | |
| 2 | 0 | x20,y20 | L7 | |
|  | 1 | x21,y21 | L8 | |
|  | 2 | x22,y22 | L9 | |
|  | 3 | x23,y23 | L10 | |
|  | 4 | x24,y24 | L11 | |
| 3 | ... | ... | ... | |
|  |  |  |  | |
|  |  |  |  | |

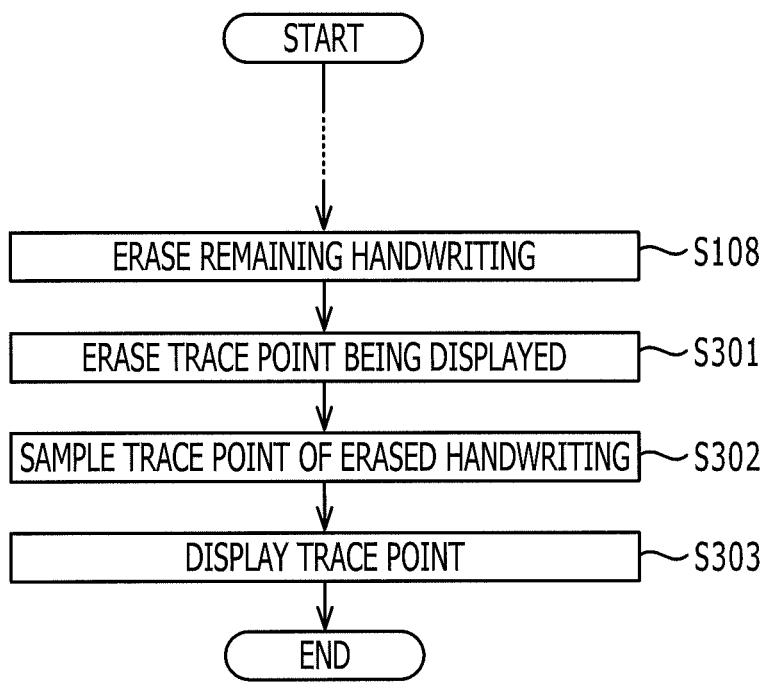

HANDWRITING INPUT DEVICE, AND HANDWRITING INPUT METHOD

CROSS-REFERENCE TO RELATED APPLICATIONS

This application is based upon and claims the benefit of priority of the prior Japanese Patent Application No. 2010-72900, filed on Mar. 26, 2010, the entire contents of which are incorporated herein by reference.

FIELD

The present embodiments relate to a handwriting input device, a handwriting input method, and a handwriting input program, where a handwriting is received as an input and the received handwriting is then displayed on a display unit.

BACKGROUND

Various handwriting input devices have been developed. Each of them uses an input unit, such as a pen-input tablet or a touch panel, to input handwritings of handwritten characters and letters on the display screen of a computer. Such a handwriting device receives an input of information in the form of a sequence of coordinate points or the like as a handwriting from the input unit of the pen-input tablet, the touch panel, or the like using input means, such as a stylus pen or a fingertip. Then the handwriting input device displays the hand-written character patterns based on the input sequence of coordinate points on the display unit of a monitor or the like. Displaying hand-written characters on the display unit in this way leads to an advantage of allowing the user to perform handwriting input while visually confirming the input contents.

Such a handwriting input device is applied to a computer system to perform password authentication by character recognition of a handwriting and then perform authentication processing, such as authentication of a writer. The authentication processing determines a writer based on the shape of an input handwriting and the speed and acceleration of writing characters. However, when a handwriting input device is used for the authentication processing, or the like, a handwriting displayed on the display unit at the time of inputting hand-written characters may lead to visual recognition of input contents by anybody else, causing a decrease in safety.

As a method for solving such disadvantages, a method that does not display a handwriting at all may be considered. However, such a method makes the user difficult to visually recognize the handwriting. Thus, the user is also difficult to recognize, for example, whether an input is actually received, collectively recognized, or the like.

Therefore, a technology is provided for deleting a handwriting after passing a predetermined time from the input of hand-written characters using a handwriting input device (see, for example, Japanese Patent No. 3105100).

SUMMARY

According to an aspect of the invention, a handwriting input device, includes: a reception unit that accepts an input of a handwriting; and a display output unit that allows a display unit to display a handwriting with a predetermined length from a starting point to a present input point from among handwritings received by the reception unit at a present input point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an exemplary storage content of a handwriting-information storage unit of the handwriting device according to the first embodiment;

FIG. 13 is an explanatory diagram illustrating another exemplary storage content of a handwriting-information storage unit of the handwriting device according to the first embodiment;

FIG. 17 is a flow chart illustrating an exemplary representation of handwriting and exemplary erasing processing of the handwriting input device according to the second embodiment;

DESCRIPTION OF EMBODIMENTS

The method for deleting a handwriting after passing a predetermined time has a disadvantage in that any of other persons who are visually recognizing handwriting can grasp the content of input because the length of the handwriting being displayed increases as the rate of handwriting increases.

If the rate of handwriting is slow, there is another disadvantage in that the state of the handwriting being displayed becomes almost similar to that of the method that does not display handwriting.

Hereinafter, the contents of the technology disclosed in the present application will be described in detail with reference to the attached drawings that illustrate the embodiments of such a technology. A handwriting input device of the present application is applied to various kinds of apparatuses including stationary type apparatuses, such as personal computers; mobile apparatuses, such as mobile phones, mobile computers, and personal digital assistants (PDAs); and installation type apparatuses, such as automated teller machines (ATMs) in banking facilities. The application method may be one using software that realizes the application by program execution or may be one using hardware, such as any of various kinds of embedded circuits, peripherals, and so on.

First Embodiment

Figure 1:
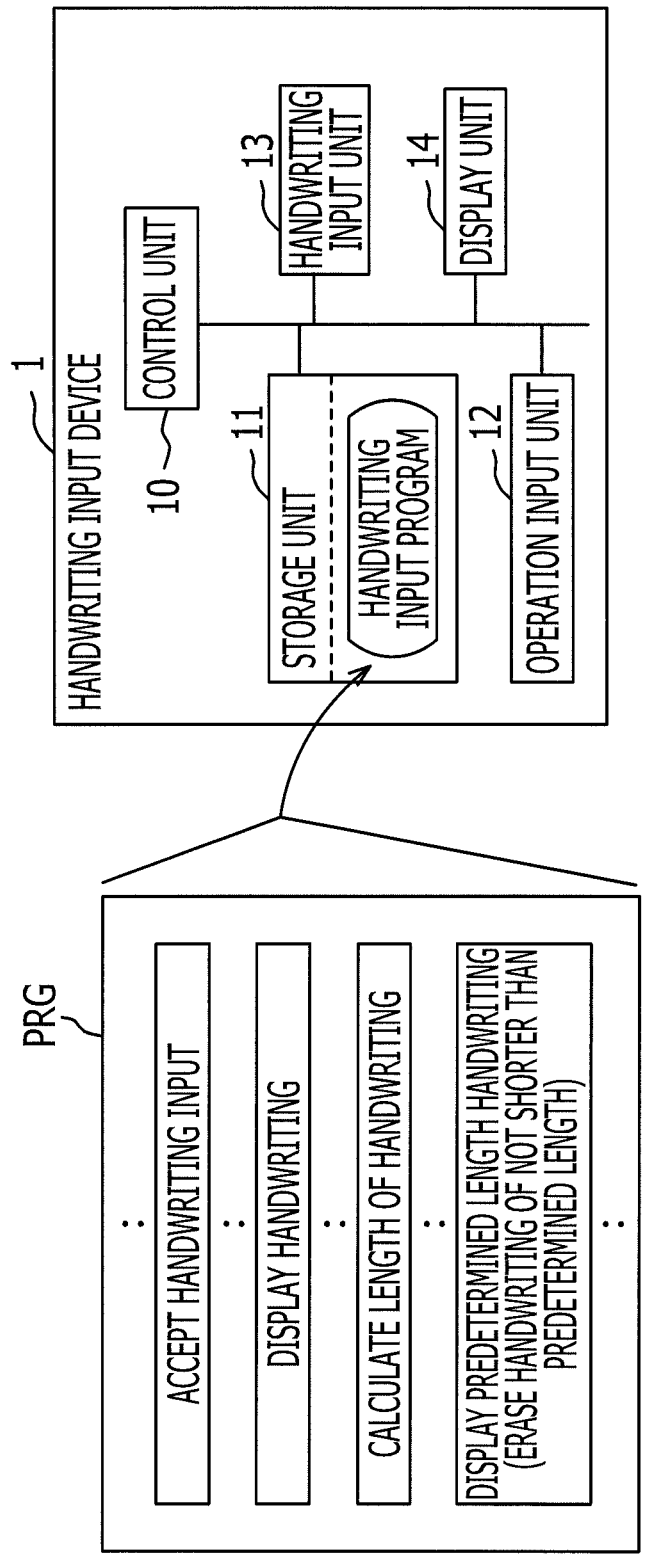
FIG. 1 is a block diagram illustrating an exemplary hardware configuration of a handwriting input device according to a first embodiment.

First, the hardware configuration of a handwriting input device according to a first embodiment will be described FIG. 1 is a block diagram illustrating an exemplary hardware configuration of the handwriting input device according to the first embodiment. In FIG. 1, reference numeral 1 denotes a handwriting input device which can be applied to various kinds of apparatuses, such as stationary, mobile, and installation type apparatuses.

In the following description, an example in which the stationary type personal computer is used for realizing the handwriting input device 1 of the present application will be described. The handwriting input device 1 includes various kinds of mechanisms, such as a control unit 10, a storage unit 11, an operation input unit 12, a handwriting input unit 13, and a display unit 14.

The control unit 10 is a computing mechanism, such as a central processing unit (CPU) that controls the entire device. The control unit 10 is connected to each hardware unit in the handwriting input device 1 and executes predetermined processing according to the procedures of various programs, such as a handwriting input program (PRG). The control unit 10 includes various kinds of circuits, such as an instruction register, an instruction decoder, an arithmetic logic unit, an accumulator, an address register, and a program counter, an instruction decoder, an arithmetic circuit, an accumulator, an address register, and a program counter. The instruction register temporarily stores an instruction read from the recording unit 11. The instruction decoder decodes a machine instruction (binary numeral) and then controls the individual hardware units of the handwriting input device 1 in response to the instruction. The arithmetic circuit performs arithmetical operations, such as addition, subtraction, and numerical comparison. The accumulator temporally stores information about calculation target data, calculation results, and so on. The address register stores the addresses of the respective recording areas in the recording unit 11, where the control unit 10 performs read and write operations. The program counter shows the address of the recording area of the recording unit 11 where a next instruction to be executed is stored. In addition, the control unit 10 includes a timer required for measuring a time interval.

The storage unit 11 may be any of storage mechanisms. Examples of the storage mechanism include a magnetic storage mechanism (e.g., hard disk drive, HDD), a nonvolatile semiconductor storage mechanism (e.g., solid state disk, SSD), and a volatile storage mechanism (e.g., random access memory, RAM), and so on. The storage unit 11 stores the handwriting input program PRG of the present application. Thus, the handwriting input program PRG stored in the storage unit 11 is executed under the control of the control unit 10 to allow the handwriting input device 1 to realize various functions of the present application. For example, the handwrite input program PRG may be stored in the storage unit 11 by reading from a storage medium, such as CD-ROM, or downloading through a communication network, such as the Internet. Here, the recording unit 11 does not only store the handwriting input program PRG of the present application but also various computer programs that execute various kinds of processing.

The operation input unit 12 is an interface mechanism that accepts an operation from the input user. The operation input unit 12 outputs a signal according to the operation of the input user to the control unit 10 through an internal communication line. The operation input unit 12 is constructed of mechanisms, such as a keyboard, a mouse, and their attached circuits and attached programs.

The handwriting input unit 13 is an interface mechanism that accepts the handwritten input from input user.

The handwriting input unit 13 outputs a signal according to the input from the input user to the control unit 10 through the internal communication line. The handwriting input unit 13 is constructed of mechanisms, such as a pen input tablet, a liquid crystal touch panel, and their attached circuits and attached programs. For example, the handwriting input unit 13 is designed to accept the trace of an input member (e.g., stylus pen) or the finger on the input surface of the touch panel.

The display unit 14 is an interface mechanism that outputs an image. The display unit 14 is constructed of mechanisms, such as a liquid crystal display that outputs a video based on a control instruction from the control unit 10, a liquid crystal panel, and their attached circuits and attached programs.

Figure 2:
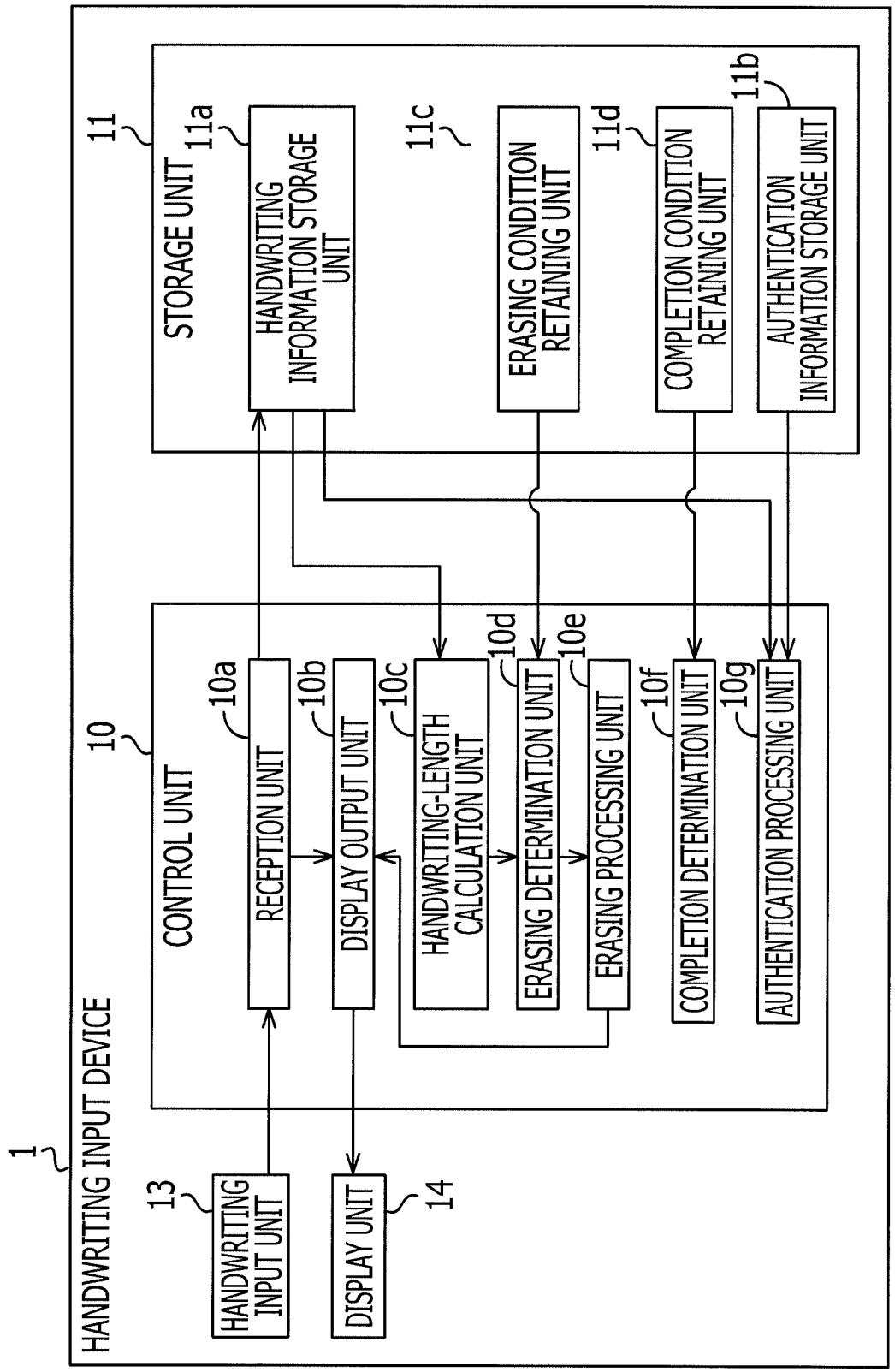
FIG. 2 is a block diagram illustrating an exemplary functional configuration of the handwriting input device according to the first embodiment.

Next, the functional constitution of the handwriting input device 1 according to the first embodiment will be described. FIG. 2 is a block diagram illustrating an exemplary functional configuration of the handwriting input device 1 according to the first embodiment. The handwriting input device 1 permits the execution of functions, such as those of a reception unit 10a, a display output unit 10b, a handwriting-length calculation unit 10c, an erasing determination unit 10d, an erasing processing unit 10e, a completion determination unit 10f, and an authentication processing unit 10g, by executing a handwritten input program PRG under the controls of the control unit 10. Alternatively, instead of executing the handwritten input program PRG, circuits that realize functions, such as those of the reception unit 10a, the display output unit 10b, the handwriting-length calculation unit 10c, the erasing determination unit 10d, the erasing processing unit 10e, the completion determination unit 10f, and the authentication processing unit 10g, may be incorporated.

The reception unit 10a is a structural element, such as a program module or a circuit, which activates the control unit 10 to accept handwriting input from the handwriting input unit 13. The reception unit 10a accepts the input of handwriting as an instruction representing data and movement of the coordinates that indicate a location on the handwriting input unit 13 or the display unit 14.

The display output unit 10b is a structural element, such as a program module or a circuit, which activates the control unit 10 to display an image, such as handwriting, accepted by the reception unit 10a on the display unit 14.

The handwriting-length calculation unit 10c is a structural element, such as a program module or a circuit, which activates the control unit 10 to calculate the length of handwriting displayed on the display unit 14. The length of handwriting is calculated by obtaining a total value of pixels of the handwriting being displayed, the integrated value of the distance between the points extracted from the handwriting.

The erasing determination unit 10d is a structural element, such as a program module or a circuit, which activates the control unit 10 to make a comparison between the handwriting length calculated by the handwriting-length calculation unit 10c and the predetermined length. The necessity of elimination of the handwriting is determined based on the result of the comparison performed by the erasing determination unit 10d.

If it is determined that the handwriting length exceeds the predetermined length from the result of the comparison performed by the erasing determination unit 10d, the erasing processing unit 10e is a structural element, such as a program module or a circuit, which activates the control unit 10 to erase the handwriting being displayed from the previously displayed portion. The erasing processing unit 10e erases the handwriting so as to be not more than the predetermined length if the length of the handwriting exceeds the predetermined length. Furthermore, if the reception of the handwriting is completed, then the erasing processing is performed even when the predetermined conditions for erasing the entire hardwiring being displayed are satisfied. The handwriting, after a unit of erasing and/or whole erasing by the processing of the erasing processing unit 10e, is output as a display (erasing) instruction from the display output unit 10b to the display unit 14 to erase a unit and/or whole of the handwriting being displayed on the display unit 14.

The completion determination unit 10f is a structural element, such as a program module or a circuit, which activates the control unit 10 to determine whether the reception of the input of the handwriting is completed. The completion determination unit 10f determines that the reception of the input of the handwriting is completed when detecting that, for example, an input member used for inputting the handwriting is separated from the handwriting input unit 13.

The authentication processing unit 10g is a structural element, such as a program module or a circuit, which activates the control unit 10 to execute the authentication processing based on the handwriting which is being accepted to be input. The authentication processing unit 10g performs various kinds of the authentication processing, such as processing of character recognition, authentication processing with handwriting-pattern matching, and processing with password matching.

In addition, the handwriting input device 1 executes the handwritten input program RPG based on the control of the control unit 10 to allow the unit of the storage area of the storage unit 11 to be used as a handwriting information storage unit 11a, an authentication information storage unit 11b, an erasing condition retaining unit 11c, a completion condition retaining unit 11d, and so on.

The handwriting information storage unit 11a is an information storage area that records the handwriting which has been accepted to be input. The handwriting information storage unit 11a stores all the handwritings which have been accepted to be input, including handwritings which have not been displayed on the display unit 14 because of being erased. The stored handwriting information is used for various kinds of processing, such as authentication processing by the authentication processing unit 10g. Furthermore, unit of the volatile memory, such as a register, of the control unit 10 may be used as an information storage unit to be used as a handwriting information storage unit 11a.

The authentication information storage unit 11b is an information storage area that stores authentication information to be used for authentication by the authentication processing unit 10g. For example, the information used for character recognition from handwriting, the information representing the characteristic of the individual's handwriting used for handwriting authentication, and the information of passwords or the like used for authentication serve as the authentication information stored in the authentication information storage unit 11b, respectively.

The erasing condition retaining unit 11c is an information storage area on which the erasing determination unit 10d stores the erasing conditions, such as a predetermined length to be compared with the handwriting length by the erasing determination unit 10d. Here, it is not always necessary to secure the erasing condition retaining unit 11c as an independent storage area.

For example, erasing conditions may be formed in a program module which can be executed as the erasing determination unit 10d.

The completion condition retaining unit 11d is an information storage area that stores the conditions of the completion determination unit 10f to determine whether the reception of the input of the handwriting is completed.

Here, it is not always necessary to secure the completion condition retaining unit 11d as an independent storage area. For example, completion conditions may be created in a program module which can be executed as the complete determination unit 10f.

Figure 3A:
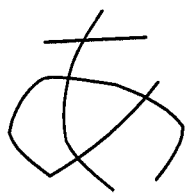
FIGS. 3A to 3D are explanatory diagrams illustrating exemplary processing carried out by a handwriting-length calculation unit of the handwriting input device according to the first embodiment.
Figure 3B:
Figure 3C:
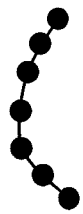
Figure 3D:
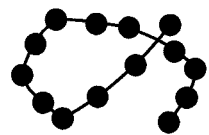

Here, as basic processing in the handwriting-length calculation unit 1, the processing of the handwriting-length calculation unit 10c and the stored contents of the handwriting information storage unit 11a will be described. FIGS. 3A to 3D are explanatory diagrams illustrating an example of processing of the handwriting-length calculation unit 10c of the handwriting input device 1 of the first embodiment of the present application. As processing performed by the handwriting-length calculation unit 10c, a method for calculating the length of handwriting as the integrated value of the distance between the points extracted from the handwriting will be described. FIG. 3A is a diagram illustrating a Japanese character which is an accepted handwritten input as a handwriting. FIGS. 3B to 3D are diagrams illustrating the strokes in the accepted Japanese character, respectively. The reception unit 10a extracts the coordinates of a point which has been input at the timing previously defined, for example at every predetermined interval of time and/or every predetermined length. In FIGS. 3B to 3D, a solid line shows the trace of handwriting which has been accepted to be input and closed circles show the extracted points. The handwriting-length calculation unit 10c calculates the distance between the last extracted point and the present extracted point on the coordinates every time a point is extracted from one stroke in the Japanese character. Then, the handwriting-length calculation unit 10c outputs the integrated value of the calculated lengths as a length of handwriting. The method for calculating the length of handwriting is not limited to the method shown in FIGS. 3A to 3D. Alternatively, the method may be any of suitable methods, such as one using the total of the numbers of pixels in the respective strokes in the Japanese character.

FIG. 4 is an explanatory diagram showing an example of the stored contents of the handwriting information storage unit 11a of the handwriting input device 1 according to the first embodiment of the present application. In the handwriting information storage unit 11a, the handwriting information which has been accepted to be input is stored by unit of the stroke in the Japanese character. Then, as the information per stroke, the coordinates of each point in the handwriting of the stroke and the distance between such a point and the last point are stored. In the example shown in FIG. 4, it is shown that a first stroke is constructed of six points and the coordinates of the respective points are represented by both the X-coordinate and the Y-coordinate, such as (x10, y10) or (x11, y11). In addition, in the example shown in FIG. 4, for the written point number 1 of the first stroke, the distance calculated on the basis of the coordinates (x11, y11) of the written point number 1 and the coordinates (x10, y10) of the last point (i.e., written point number 2) is recorded. The distance between the points can be represented as the Euclidean distance on the logic plane defined by the coordinates.

Figure 5:
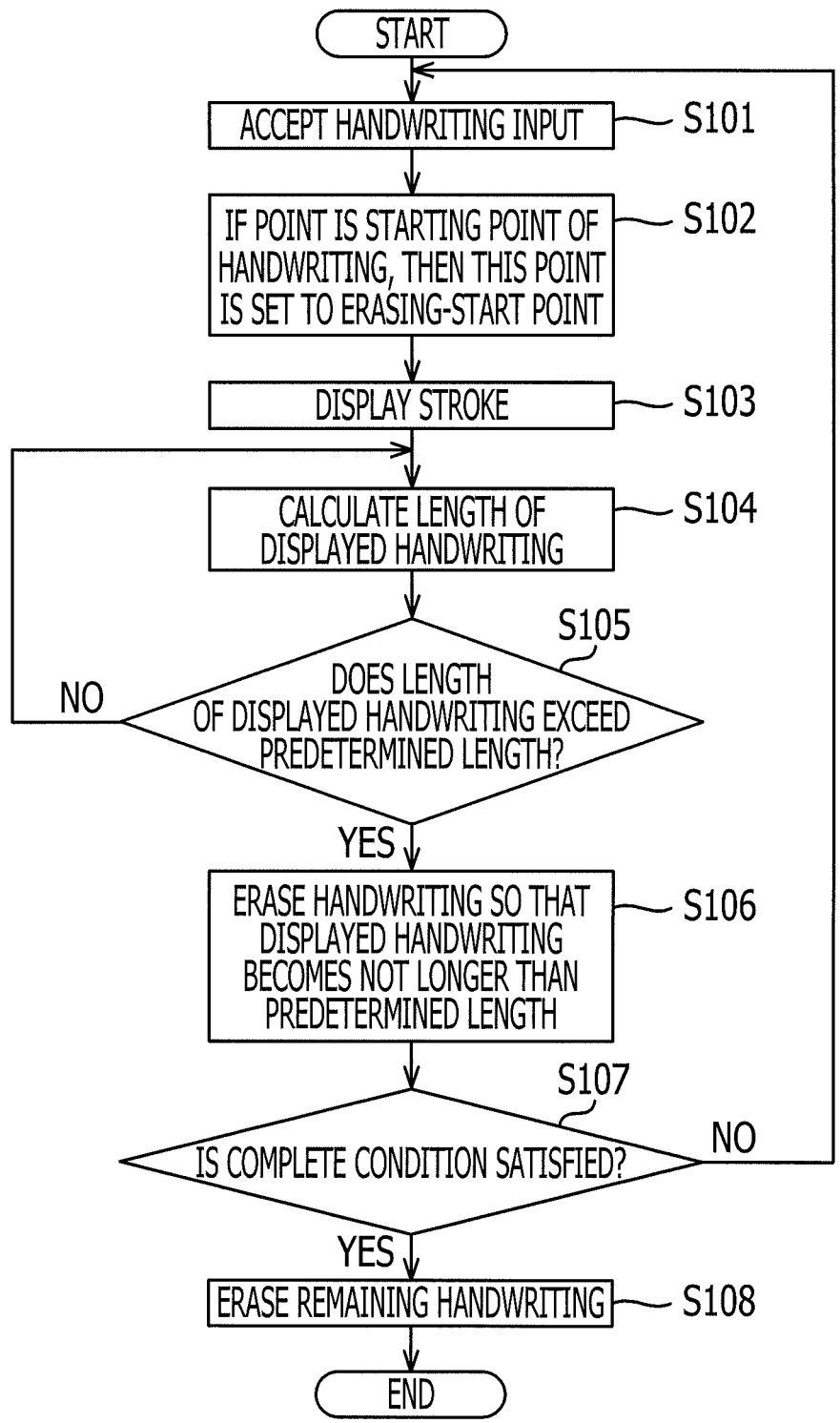
FIG. 5 is a flow chart illustrating an exemplary representation of handwriting and exemplary erasing processing of the handwriting input device according to the first embodiment.

Next, the main processing of the handwriting input device 1 according to the first embodiment of the present application will be described. FIG. 5 is a flow chart illustrating an exemplary representation of handwriting and exemplary erasing processing of the handwriting input device 1 according to the first embodiment. The handwriting representation and erasing processing of the first embodiment of the present application are those for representing the handwriting which has been accepted to be input and the processing for erasing the handwriting based on the length of handwriting. The processing shown in FIG. 5 can be executed every time of accepting the input handwriting from the handwriting input unit 13.

The handwriting input device 1 executes the handwriting representation and the erasing processing as described below when the input of handwriting is accepted under the controls of the control unit 10 that executes the handwritten input program PRG.

The user performs the input of handwriting as a trace of the input member or the finger and then the handwriting input unit 13 accepts the input of handwriting. The control unit 10 accepts the handwriting input from the handwriting input unit 13 through the reception unit 10a (S101). The accepted handwriting is stored as handwriting information into the handwriting information storage unit 11a. As shown in FIG. 4, for example, the coordinates of the points on the accepted handwriting and the obtained coordinates are then provided with the number of the strokes and the written point number. Furthermore, if there is a precedent point on the handwriting, the distance between the points is calculated on the based on the coordinates of the last point on the handwriting and the present point of the accepted handwriting and the calculated distance is then stored. If the point of the accepted handwriting is the starting point of the handwriting, then such a point is defined as an "erasing start point" (S102). For example, in the example shown in FIG. 4, the point represented as the written point number 0 of the stroke number 1 is set to an erasing start point.

The control unit 10 allows the display output unit 10b to display the handwriting accepted by the reception unit 10a on the display unit 14 (S103). The representation on the display unit 14 may be performed, for example, on the basis of the coordinates of the accepted handwriting, by displaying points with different background colors or different gradients on the positions of the display unit 14 corresponding to the coordinates. Such representation allows the input user to visually confirm the handwriting corresponding to the input one as the handwriting represented in the display unit 14.

The control unit 10 employs the handwriting-length calculation unit 10c (S104) to calculate the length of the handwriting being displayed on the display unit 14. In S104, for example, the length of the handwriting is calculated using the following formula 1:

$$TL(x) = \sum_{i=N-x+1}^{N} Li \qquad \text{Equation 1}$$

Equation 1 represents a computational expression for calculating the length of handwriting TL(x) from the present handwritten point to a certain point x, where N represents the total number of handwritten points.

In other words, based on the handwriting information recorded on the handwriting information storage unit $11a$, the distance recorded with respect to the point on the handwriting accepted by the reception unit $10a$ and the distance recorded with respect to the point on the handwriting previously accepted by the reception unit $10a$ are added together. The result of the addition serves as a handwriting length TL(x).

The control unit 10 allows the erasing determination unit $10d$ to determine whether the handwriting length exceeds a specified length calculated by the handwriting-length calculation unit $10c$ (S105). The specified length is, for example, one extracted from information previously stored in the erasing condition retaining unit $11c$.

Specifically, first, the processing performed in S104 to S105 includes calculating the distance between the point on the handwriting accepted by the reception unit $10a$ and the last point on the handwriting accepted by the reception unit $10a$ by the reception unit $10a$. Then, in S105, the control unit 10 allows the erasing determination unit $10d$ to perform decision processing. Subsequently, in S105, if it is determined that the handwriting length is not longer than the predetermined length, then the reception unit $10a$ calculates the distance between the point on the handwriting accepted by the reception unit $10a$ and the second last point on the handwriting accepted by the reception unit $10a$. In this way, the distance between the point on the handwriting accepted by the reception unit $10a$ and any of points on the handwriting previously accepted by the reception unit $10a$ is calculated, and the decision processing in S105 is then performed. The processing is repeatedly performed until the decision processing in S105 determines that the calculated handwriting length exceeds the predetermined length.

More specifically, in the example shown in FIG. 4, it is assumed that the reception unit $10a$ has accepted the written point number 6 of the stroke number 1. The elimination start point is set to the point with the written point number 0 of the Japanese character number 1. First, the control unit 10 calculates the value of L6, the distance between the written point number 5 and the written point number 6 as a length of handwriting. Here, the written point number 5 corresponds to the last point stored and is one before the written point number 6. Based on the calculated handwriting, the decision processing of S105 is performed. In S105, if it is determined that the calculated handwriting length does not exceed the predetermined length, then the control unit 10 allows the handwriting-length calculation unit $10c$ to perform the decision processing in S105. In this step, the distance from the last point which is stored with respect to the handwriting point number 4, the last second from the written point number 6, is a result of addition of the value of L5 and the value of L6 and defined as a handwriting length. In the decision processing in S105, until it is determined that the calculated handwriting length exceeds the predetermined length, the handwriting-length calculation unit $10c$ repeatedly calculates the length of the handwriting by adding the distance between the last point of the handwriting with respect to every point and the point of the handwriting accepted by the reception unit $10a$ to the previously obtained distance.

Returning now to the flow chart, in S105, if it is determined that the handwriting length calculated by the erasing determination unit $10d$ exceeds the predetermined length ("YES" in S105), then the control unit 10 allows the erasing processing unit $10e$ to specify a portion to be erased from the handwriting accepted by the reception unit $10a$ and then erase the specified portion (S106). Specifically, in the erasing processing unit $10e$, an erasing target is the handwriting from the next point from the one at which it is determined that the handwriting length exceeds the predetermined value to the point which is set to the erasing start point. For example, in the example shown in FIG. 4, it is assumed that the point of the handwriting accepted by the reception unit $10a$ corresponds to the written point number 6 of the stroke number 1, while the point at which it is determined that the handwriting length calculated by the handwriting-length calculation unit $10c$ exceeds the predetermined point corresponds to the written point number 3 of the stroke number 1. The erasing processing part $10e$ specifies from the written point number 0 of the stroke number 1, which is defined as an erasing start point, to the written point number 4 of the stroke number 1 as erasing targets and then erases the handwriting from the written point number 0 of the stroke number 1 to the written point number 4 of the stroke number 0, which are being specified. In S106, the erasing processing part $10e$ erases the handwriting so that the length of the handwriting becomes the predetermined length. It is noted that it may be not longer than the predetermined length. For example, other erasing conditions, such as a period of time, may be set to perform erasing until the handwriting becomes less than the predetermined length.

The handwriting is erased sequentially from the portion displayed previously. Therefore, the display unit 14 displays the handwriting with a predetermined length extending from the portion where the handwriting is newly displayed, or the position corresponding to the position where the pen tip of the input member touches the handwriting input unit 13. Subsequently, the processing in S108, which will be described later, is performed after the erasing.

In S105, if S104 determines that the handwriting length calculated by the handwriting-length calculation unit $10c$ does not exceed the predetermined length ("NO" in S105), then the control unit 10 returns to the processing in S104.

The control unit 10 allows the completion determination unit $10f$ to determine whether the completion condition is fulfilled (S107). The completion condition to be used is one stored in the completion condition retaining unit $11d$. Here, if the completion conditions are detected such that the input member touches the handwriting input unit 13 (pen down), the input of handwriting is accepted, and the input member is untouched from the handwriting input unit 13 (pen up), then it is determined that the reception of handwriting input has been completed. In other words, it is determined that the completion condition is fulfilled when the input of one stroke in the character is completed and the input user takes it off from the handwriting input unit 13. Here, the same is also applied to the case where the fingertip is used for input instead of the input member. Alternatively, if the input of operation for initiating the authentication processing with pattern matching for the content of the handwritten input is accepted through the operation input unit 12 or the handwriting input unit 13, it may be determined that the reception of handwriting input has been completed.

In S107, if it is determined that the completion condition has been fulfilled ("YES" in S107), then the control unit 10 allows the erasing processing unit $10e$ to erase the handwriting being displayed (S108). The erasing in S108 is processing for erasing all the handwriting being displayed. Therefore, every time the input of one stroke in the character is completed, the handwriting being displayed is erased.

Here, in S107, if it is determined that the completion condition is not satisfied ("NO" in S107), then the control unit 10 does not proceed to the handwriting-erasing processing in S108 but to S101, thereby repeating the subsequent procedures. Thus, the processing for displaying and erasing handwriting according to the first embodiment can be executed.

Figure 6:
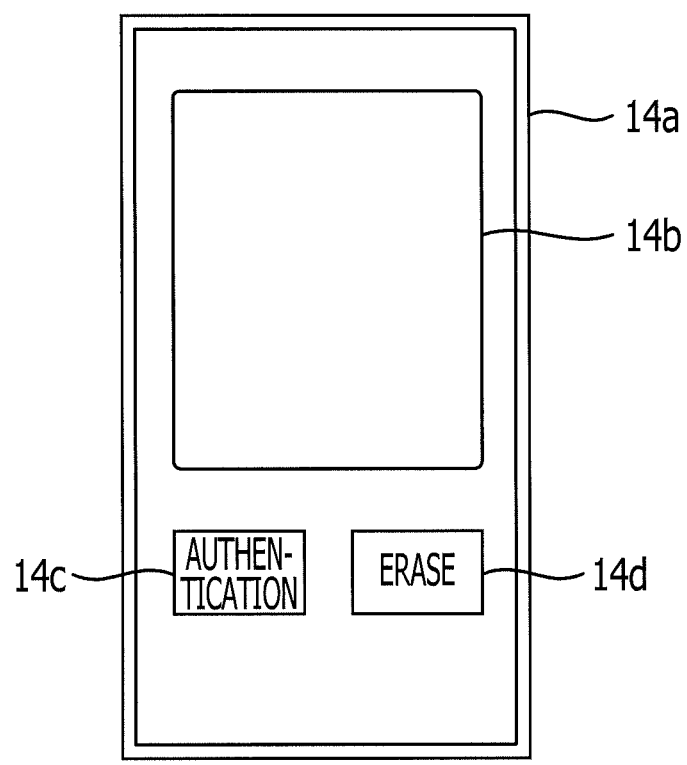
FIG. 6 is an explanatory diagram illustrating an exemplary screen displayed on the display unit of the handwriting input device according to the first embodiment.

Next, specific examples for application of the handwriting input device 1 according to the first embodiment will be described. FIG. 6 is an explanatory diagram illustrating an exemplary screen displayed on the display unit 14 of the handwriting input device 1 according to the first embodiment. The example of the screen shown in FIG. 6 represents one displayed on the display unit 14 when the processing for displaying and erasing handwriting is initiated. An outer frame region 14a surrounded by an outer closing line represents a handwriting input window (display window). A handwriting-display column 14b is a rectangular region represented upward on almost the middle of the outer frame region 14a and responsible for displaying handwriting based on a handwritten input. Images of an authentication button 14c and an erase buttons are displayed under the handwriting-display column 14b. If the handwriting input device 1 accepts an input for directing the authentication button 14c, S108 for the processing for displaying and erasing handwriting determines that the processing can be completed and then completes the processing for displaying and erasing handwriting, followed by executing the authentication processing. In addition, if the handwriting input device 1 accepts an input for directing the erase button 14d, S108 for the processing for displaying and erasing handwriting determines that the processing can be completed and then completes the processing for erasing the handwriting being accepted to be input, or the handwriting information stored in the handwriting information storage part 11a. In this case, the subsequent processing after the authentication or the like is not performed. The handwriting-display column 14b, the authentication button 14c, and the erase button 14d shown in FIG. 6 are illustrative examples. Alternatively, for example, they may be configured such that only the handwriting-display column 14b is displayed on the outer frame region 14a. In this case, for example, the operations corresponding to the instructions from the authentication button 14c and the erase button 14d may be suitably defined by another method using the operation input unit 12 or the like.

Figure 7:
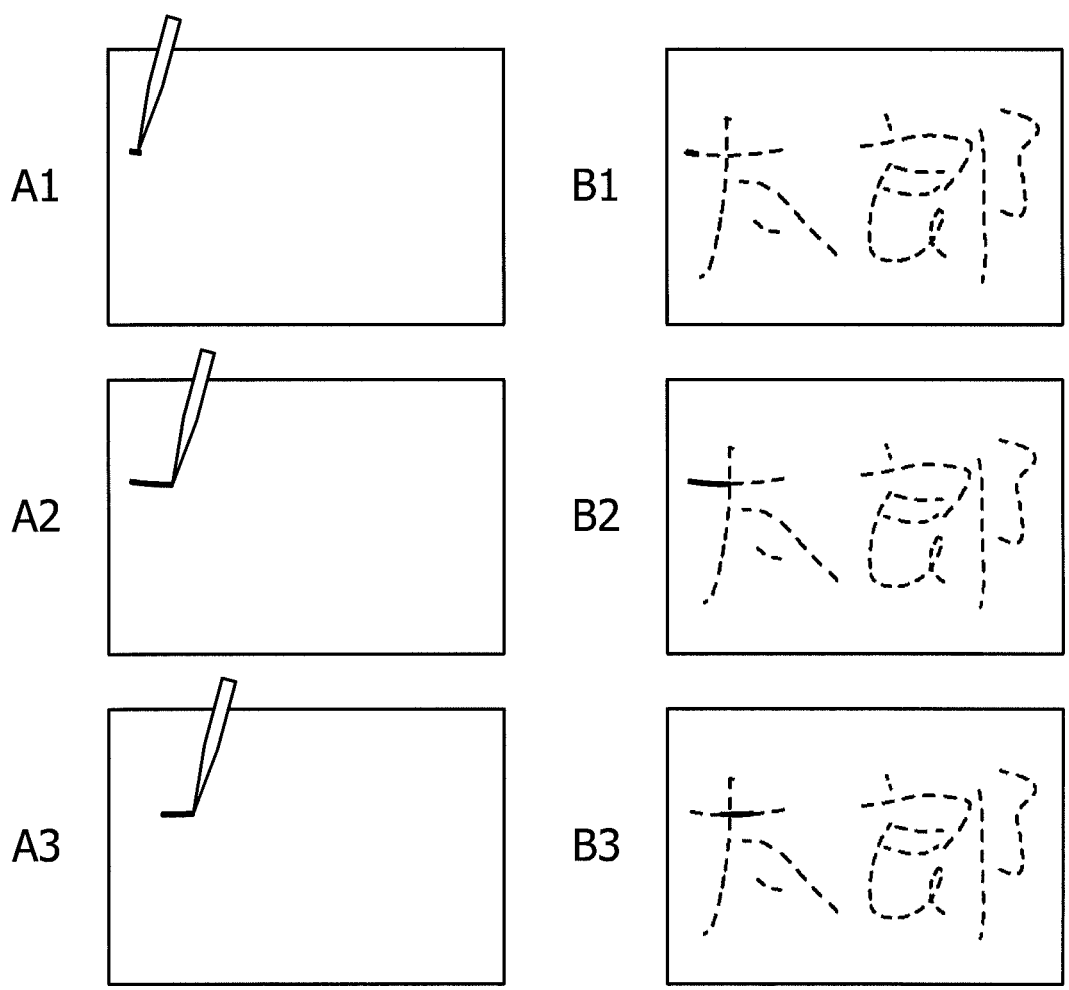
FIG. 7 is an explanatory diagram, where panels A1 to A3 and B1 to B3 illustrate the states of an exemplary input of the handwriting input device of the first embodiment, respectively.
Figure 8:
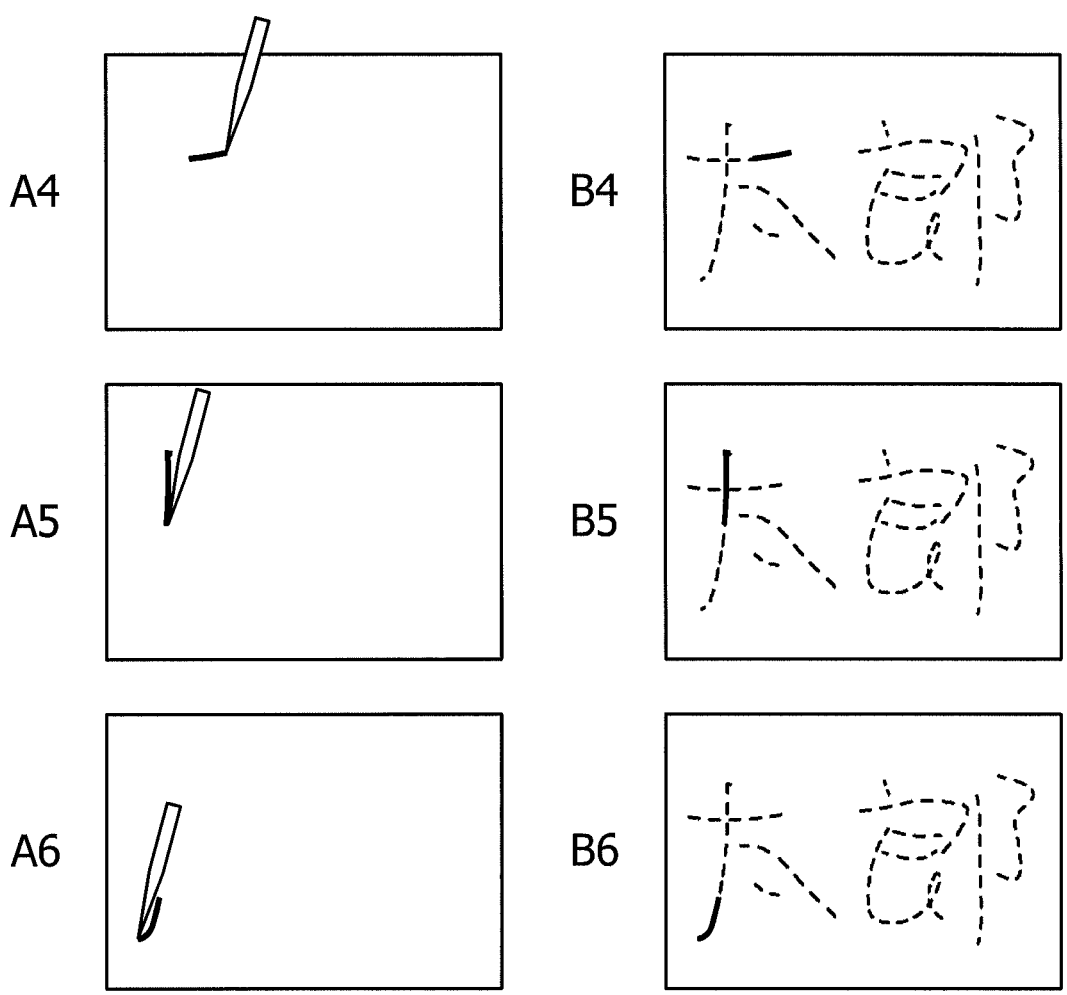
FIG. 8 is an explanatory diagram, where panels A4 to A6 and B4 to B6 illustrate the states of an exemplary input of the handwriting input device of the first embodiment, respectively.

FIG. 7 and FIG. 8 are explanatory diagrams showing example of input states of the handwriting input device 1 according to the first embodiment, respectively. Where the handwriting input device 1 is configured as an integrated combination of the handwriting input unit 13 and the display unit 14 like a liquid crystal panel, each of panels, A1 to A3 in FIG. 7 and A4 to A6 in FIG. 8, illustrates handwriting and a stylus pen provided as an input member displayed on the display unit 14. Each of panels, B1 to B3 in FIG. 7 and B4 to B6 in FIG. 8, represents a handwriting displayed on the display unit 14. Panels A1 to A6 correspond to panels B1 to B6, respectively. Here, in panels B1 to B6, the handwriting being input by the input user is represented by a dashed line. An input character portion being displayed is represented by a solid line.

FIG. 7 and FIG. 8 illustrate the states of handwritten input of two Japanese characters, respectively. Panel A1 (B1) represents the state where the reception of an input of a crossbar, the first stroke in the first character, is started. From panel A1 (B1) to panel A2 (B2), the input of the crossbar continues and the crossbar is being represented as handwriting. From panel A3 (B3) to panel A4 (B4), since the handwriting length of the crossbar has exceeded a predetermined length, the state of erasing the portions of the crossbar from one displayed first is represented. Panel A5 (B5) represents the state where the reception of an input of the second stroke in the first character from the top to the left. Here, in panel A5 (B5), the crossbar of the first stroke in the first character is erased upon separating the input member from the handwriting input unit 13 after the state shown in panel A4 (B4). In panel A6 (B6), since the handwriting length of the input of the second stroke in the first character extending from the top to the left has exceeded a predetermined length, the state of erasing the portions of the crossbar from one displayed first is represented. In the handwriting input device 1 of the first embodiment, handwritings can be displayed as shown in FIG. 7 and FIG. 8 when two certain Japanese characters are written by hand.

Figure 9:
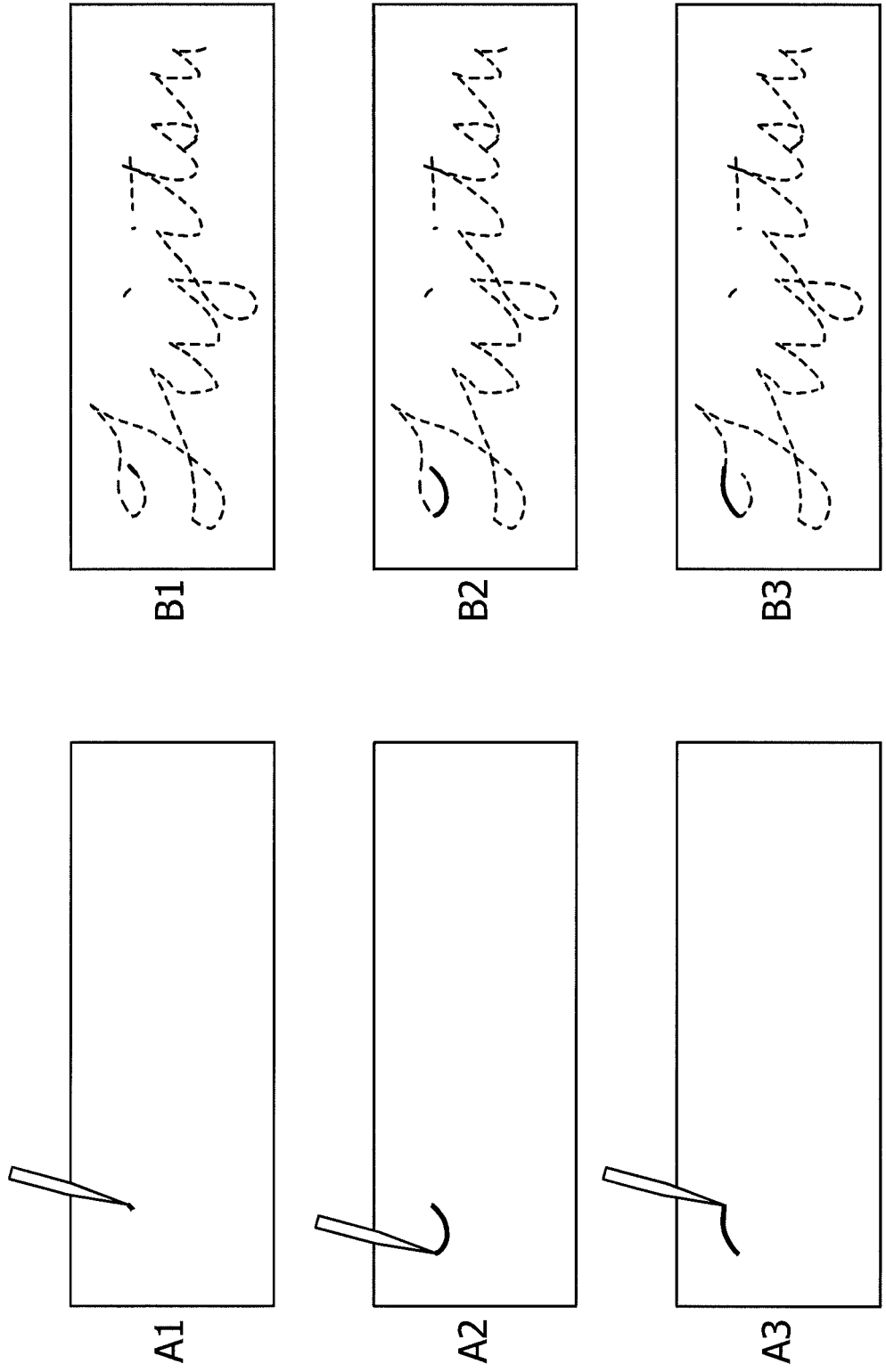
FIG. 9 is an explanatory diagram, where panels A1 to A3 and B1 to B3 illustrate the states of an exemplary input of the handwriting input device of the first embodiment, respectively.
Figure 10:
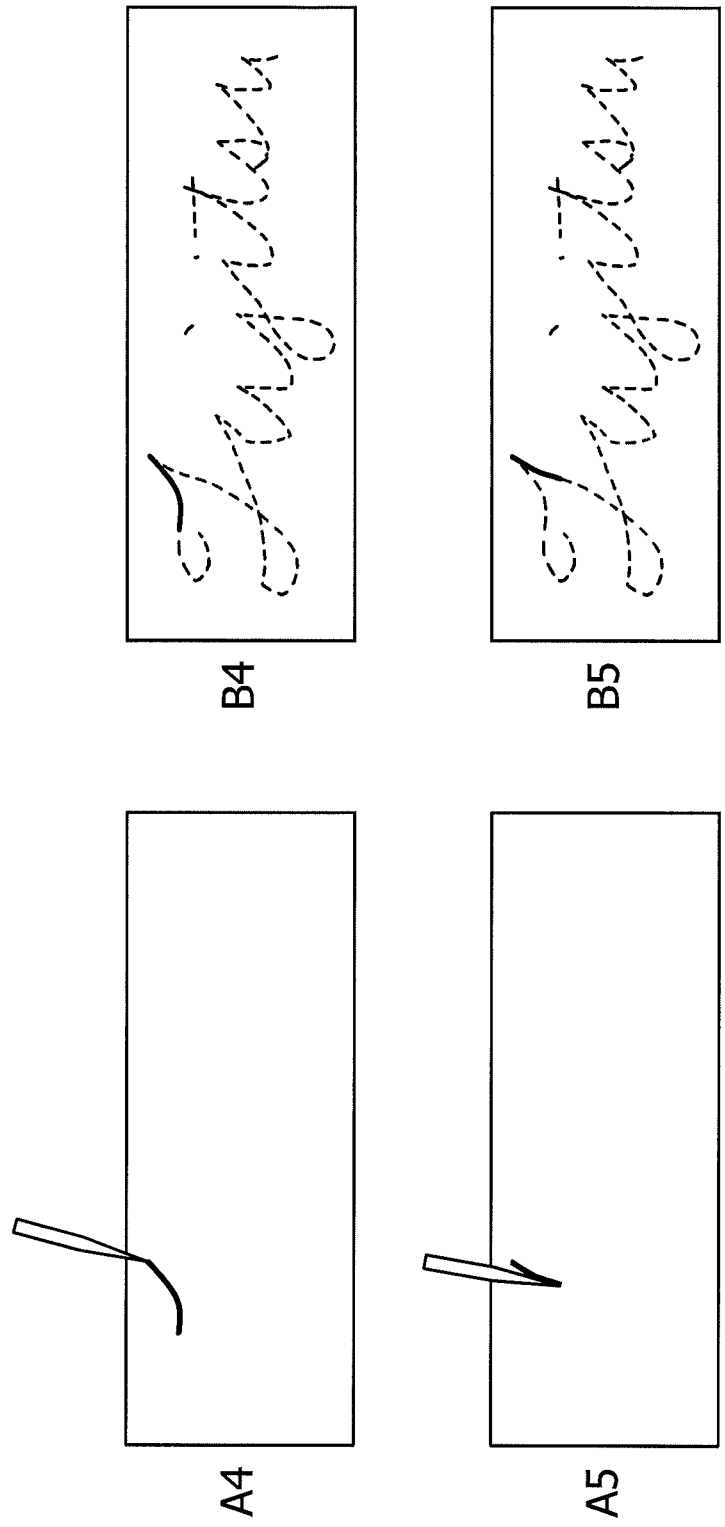
FIG. 10 is an explanatory diagram, where panels A4 and A5 and B4 and B5 illustrate the states of an exemplary input of the handwriting input device of the first embodiment, respectively.

FIG. 9 and FIG. 10 are explanatory diagrams illustrating the states of an exemplary input of the handwriting input device 1 according to the first embodiment, respectively. Where the handwriting input device 1 is configured as an integrated combination of the handwriting input unit 13 and the display unit 14, each of panels, A1 to A3 in FIG. 9 and A4 to A5 in FIG. 10, illustrates handwriting and an input member displayed on the display unit 14. Each of panels, B1 to B3 in FIG. 9 and B4 to B5 in FIG. 10, represents a handwriting displayed on the display unit 14. Panels A1 to A5 correspond to panels B1 to B5, respectively. Here, in panels B1 to B5, the handwriting being input by the input user is represented by a dashed line. An input character portion being displayed is represented by a solid line.

FIG. 9 and FIG. 10 illustrate the state where the alphabetical letters of "Fujitsu" in curving style are input by handwriting. Panel A1 (B1) represents the state where the reception of an input of "F" is started. From panel A1 (B1) to panel A2 (B2), the input of the letter "F" continues and unit of this letter is being represented as handwriting. From panel A3 (B3) to panel A5 (B5), since the handwriting length of the letter has exceeded a predetermined length, the state of erasing the portions of the handwriting from one displayed first is represented. After completing writing the horizontal line of "F", the input member is separated from the handwriting input unit 3. Thus, the horizontal line is erased and only the line extending from the upper right to the lower left is displayed in panel A5 (B5). In the handwriting input device 1 of the first embodiment, handwritings can be displayed as shown in FIG. 9 and FIG. 10 when the letters of "Fujitsu" are written by hand.

In the examples shown in FIG. 7 to FIG. 10, the completion condition is set to detect the separation of the input member from the handwriting input unit 13. Alternatively, the completion condition may be suitably set to detect any of other events. For example, after separating the input member from the handwriting input unit 13, the completion condition is set to detect the next touch of the input member on the handwriting input unit 13.

Thus, after input of one stroke in the letter, all the portions of the handwriting being displayed are erased upon starting the input of the next stroke. In the case of executing the processing in S107 by setting the completion condition, it becomes possible to visually confirm the position of the stroke in the letter which has been input immediately before the input of the next stroke.

In addition, it is also possible to execute the processing in S107 by setting the complete condition to the input of predetermined operation from the input user.

For example, the handwriting being displayed not longer than the predetermined length is erased completely by performing the operation of directing a predetermined image or the like. When the completion condition is set up as described above, it is possible to erase the handwriting after confirming the handwriting being displayed.

Alternatively, after separating the input member from the handwriting input unit 13, the completion condition may be set to the passage of a predetermined period of time to perform the processing in S107. By setting the completion condition to the passage of a predetermined period of time, the input user may be allowed to confirm the handwriting being displayed for a predetermined time after the input of the handwriting. Here, if the next stroke in the letter is accepted before the passage of a predetermined period of time, the handwriting of the last stroke in the letter may be erased upon bringing the input member into touch with the handwriting input unit 13. In addition, to make the total length of the handwriting a predetermined length or less without depending on whether it is being touched on the handwriting input unit 13, the handwriting may be erased from the portion thereof displayed first.

In addition, after satisfying the completion condition in S107, the processing in S108 may be set so that the remaining portions of the handwriting being displayed are not erased at once but erased gradually. As a specific example, the processing in which the handwriting being displayed is erased by every predetermined unit length per predetermined unit time, such as 0.1 seconds, upon separating the input member from the handwriting input unit 13.

Figure 11:
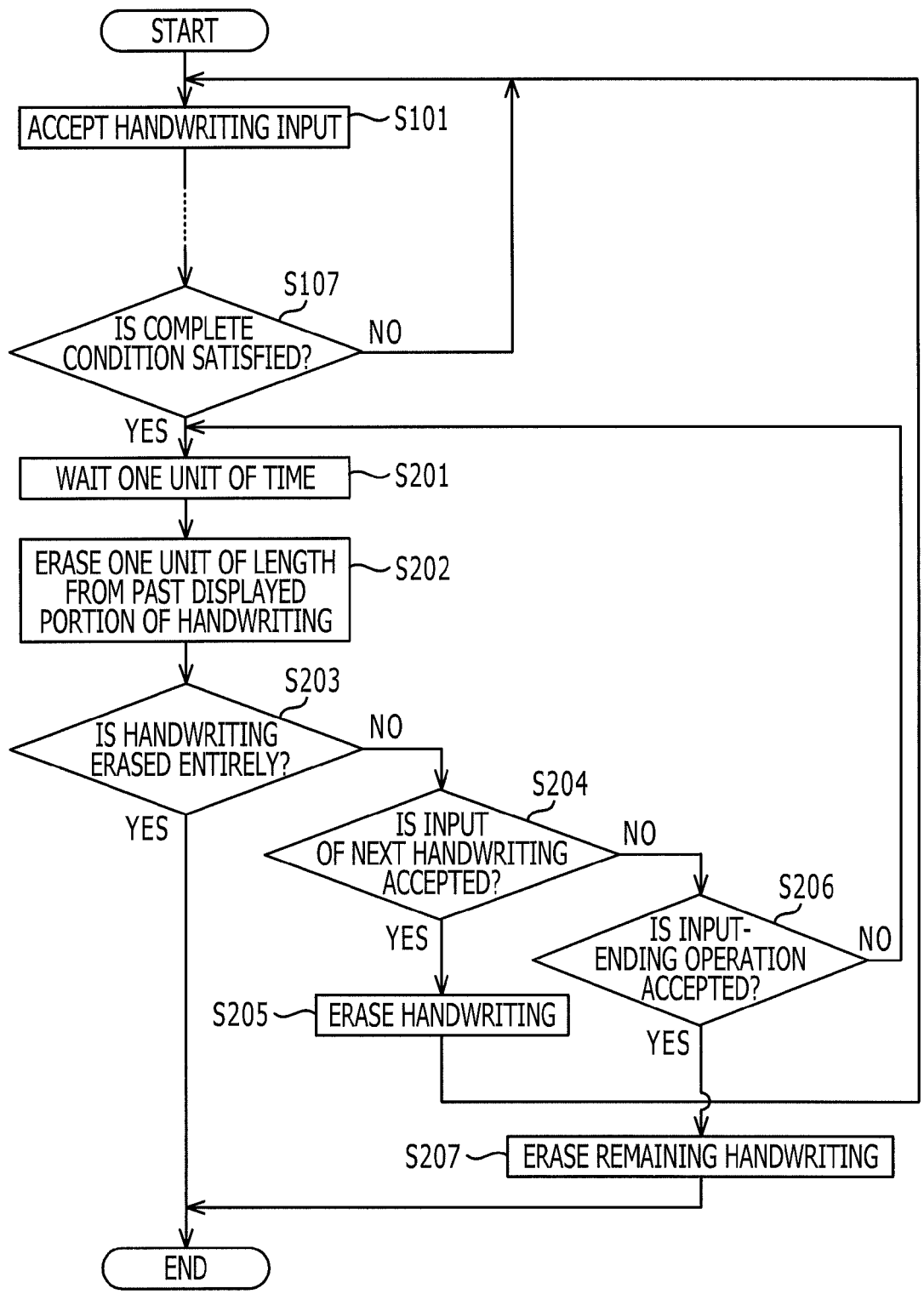
FIG. 11 is a flow chart illustrating another exemplary representation of handwriting and another exemplary erasing processing of the handwriting input device according to the first embodiment.

FIG. 11 is a flow chart illustrating another exemplary representation of handwriting and another exemplary erasing processing of the handwriting input device 1 according to the first embodiment. The handwriting input device 1 executes the handwriting representation and the erasing processing as described below when the input of handwriting is accepted under the controls of the control unit 10 that executes the handwritten input program PRG.

The processing in S101 to S106 is the same as the example of processing described using FIG. 5, so that the descriptions thereof will be omitted.

After executing the erasing processing in S106, the control unit 10 allows the completion determination unit 10f to determine whether the completion condition is fulfilled (S107). The completion condition of S107 is set to detecting the separation of the input member from the handwriting input unit 13. Furthermore, the processing which has been described with reference to FIG. 5 can be different after determining that the completion condition is satisfied in S107. The subsequent processing in this case will be described below.

In S107, if it is determined that the completion condition is fulfilled ("YES" in S107), then the control unit stands by for a predetermined unit time (S201). The predetermined unit time may be, for example, recorded in the completion condition retaining unit 11d in advance. In addition, it is preferable to set the predetermined unit time to a short time of 0.1 seconds or the like in comparison with the writing speed of the input user.

After the passage of a predetermined time, the control unit 10 allows the erasing processing unit 10e to erase a portion with a predetermined unit length of the handwriting being displayed from the past displayed portion thereof (S202). The predetermined unit length may be, for example, recorded in the completion condition retaining unit 11d in advance. In addition, for example, the unit length is determined based on the unit time in S201. The shorter the unit time and the unit length are, the more the input user can get the impression of smooth erasing. Alternatively, the unit length may be defined from one point to another in the handwriting. In this case, every time the unit time has passed, the handwriting from the point which has been obtained earlier than others among the written points recorded in the handwriting information storage unit 11a or among the points of the handwriting being displayed to the point of the handwriting which has been obtained directly after that point. The erasing processing unit 10e erases the handwriting, which is targeted by the erasing processing, from the display unit 14.

The control unit 10 determines whether the handwriting on the display unit 14 is completely erased (S203).

In S203, if it is determined that the handwriting is completely erased ("YES" in S203), then the processing for displaying and erasing handwriting is ended.

In S203, if it is determined that there is an unerased portion of the handwriting ("NO" in S203), then the control unit 10 determines whether the input of the next stroke in the letter is accepted (S204).

In S204, if it is determined that the input of the next stroke of the letter is accepted ("YES" in S204), then the control unit 10 allows the erasing processing unit 10e to erase the handwriting being displayed (S205). Then, the process returns to S101 in FIG. 5 to perform the subsequent procedures. If the next input is started without completely erasing the handwriting, the handwriting being displayed is completely erased at first and the display of the next stroke in the letter is then performed. In S205, alternatively, the remaining portion of the handwriting may be not erased completely and kept in being displayed until the sum of its length and the length of the handwriting of the next stroke in the letter exceeds a predetermined length.

In S204, if it is determined that the input of the next stroke in the letter is not accepted ("NO" in S204) then the control unit 10 determines whether the operation of ending the input is accepted (S206). For example, the operation of ending the input in S206 is one that starts the authentication about the content of the handwritten input.

In S206, if it is determined that the operation of ending the input is accepted ("YES" in S206), then the remaining portion of the handwriting being displayed is erased (S207). Subsequently, the processing for displaying and erasing handwriting is ended.

In S206, if it is determined that the operation of ending the input is not accepted ("NO" in S206), then the control unit 10 proceeds the process to 201 and then executes the subsequent procedures. In this way, another processing for displaying and erasing handwriting according to the first embodiment can be performed.

Figure 12:
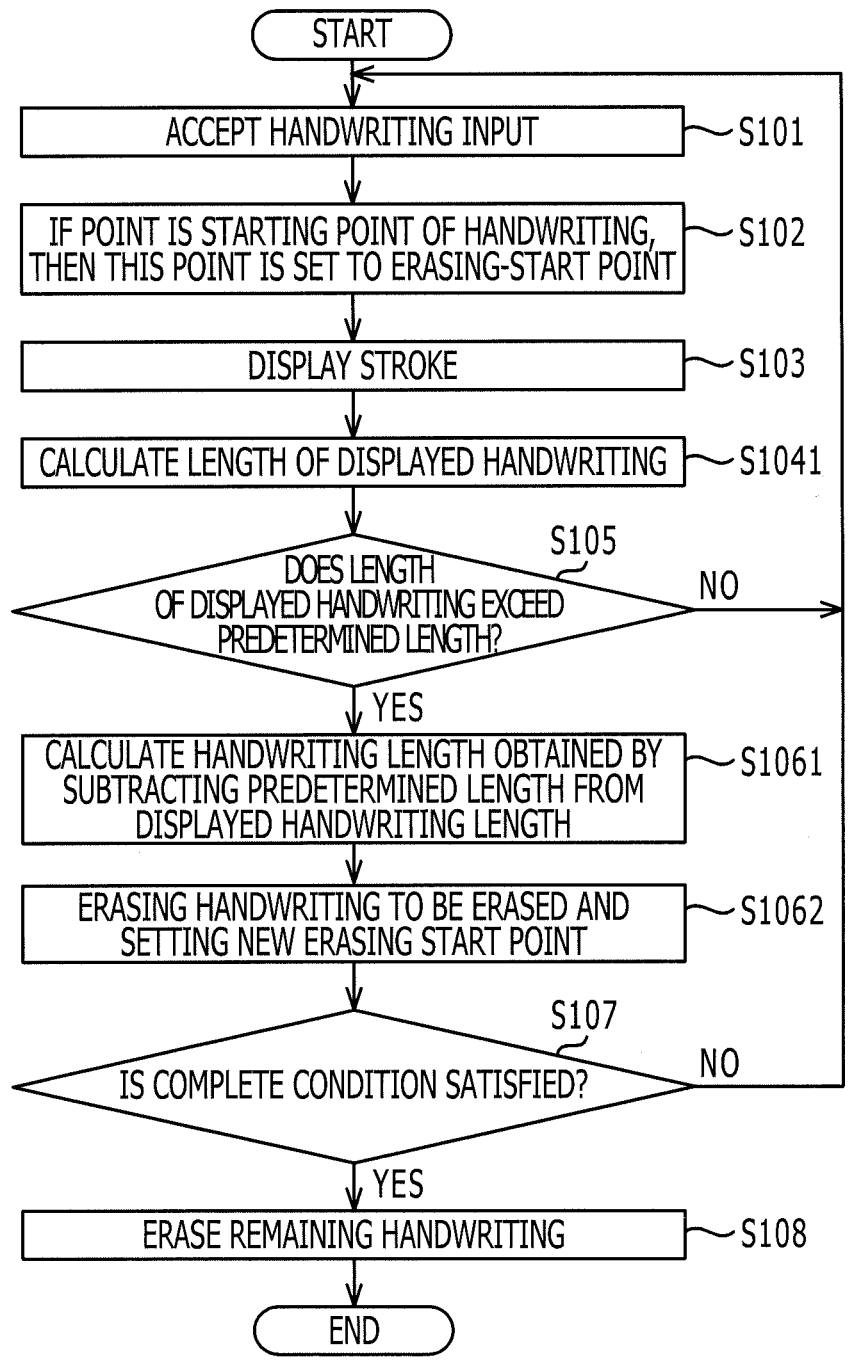
FIG. 12 is a flow chart illustrating another exemplary representation of handwriting and another exemplary erasing processing of the handwriting input device according to the first embodiment.

Next, a still another example of the processing for displaying and erasing handwriting of input device 1 according to the first embodiment of the present invention will be described. FIG. 12 is a flow chart illustrating another exemplary representation of handwriting and another exemplary erasing processing of the handwriting input device 1 according to the first embodiment. In the example shown in FIG. 5, among the points of the obtained handwriting, the latest obtained handwriting point is provided as an origin to perform the calculation of the length of the handwriting, determination of whether the calculated handwriting length exceeds the predetermined handwriting, and so on. In the present embodiment, the handwriting to be served as a target for the calculation of the handwriting length of the erasing is specified using the starting point of the handwriting as an origin. Here, the processing in S101 to S103, S105, and S107 to S108 are the same as the example of processing described using FIG. 5, so that the same structural elements as those in FIG. 5 are designated by the same reference numerals and their detail description will be omitted. In addition the processing shown in FIG. 12, just as in the case with the processing shown in FIG. 5, the processing is performed every time the handwriting input from the handwriting input unit 13 is accepted.

FIG. 13 is an explanatory diagram showing another example of the stored contents of the handwriting information storage unit 11a of the handwriting input device 1 according to the first embodiment of the present application. In addition to the example shown in FIG. 4, the column of the erasing start point is added. This shows which point is set to the point to be served as an origin for calculating the handwriting length. In the example shown in FIG. 13, the point of the written point number 2 of the stroke number 1 is set to the erasing start point.

Returning to the flow chart, after performing the processing in S101 to S103, the control unit 10 allows the handwriting-length calculation unit 10c to calculate the length of the hand displayed on the display unit 14 (S1041). In S1041, for example, the length of the handwriting is calculated using the following formula 2:

$$TS(x) = \sum_{i=n+1}^{x} Li \qquad \text{Equation 2}$$

In Equation 2, n denotes an erasing start point. Equation 2 is a computational expression for calculating the handwriting length TS(x) from the erasing start point n to a certain point x. In other words, Equation 2 works out the distance from the point served as the erasing start point to the point of the handwriting being accepted by the reception unit 10a, based on the handwriting information stored in the handwriting information storage unit 11a. The calculated result serves as a handwriting length TS(x).

The control unit 10 allows the erasing determination unit 10d to determine whether the handwriting length calculated by the handwriting-length calculation unit 10c exceeds a predetermined length (S105).

In S105, if it is determined whether the handwriting length calculated by the handwriting-length calculation unit 10c does not exceed the predetermined length ("NO" in S105), then the process returns to S101 to bring the reception of the next handwriting input stands into stand-by mode.

In S105, if it is determined that the handwriting length calculated by the handwriting-length calculation unit 10c exceeds the predetermined length ("YES" in S105), the control unit 10 allows the erasing processing unit 10e to calculate the remaining length obtained by subtracting the predetermined length from the calculated handwriting length (S1061).

The control unit 10 allows the erasing processing unit 10e to refer to the handwriting information storage unit 11a and then calculates the length from the point that serves as an erasing start point to each of the points of the handwriting being accepted subsequent to the erasing start point in order. Then, the control unit 10 specifies a point where the calculated length exceeds the remaining length. In addition, an erasing target is set to the handwriting extending from the point that serves as an erasing start point to the point specified based on the remaining length. Subsequently, the handwriting provided as an erasing target is erased from the display unit 14. Furthermore, the control unit 10 allows the erasing processing unit 10e to set a point defined as one longer than the calculated remaining length to a new erasing start point (S1062). After that, the procedures subsequent to S107 are executed.

In the example shown in FIG. 13, the erasing start point is set to the written point number 2 of the stroke number 1. It is supposed that the reception unit 10a accepts the written point number 6 of the stroke number 1 as a new handwriting. The handwriting-length calculation unit 10c calculates the handwriting length from the writing point number 6 of the stroke number 1, which serves as the erasing start point, to the written point number 6 of the stroke number 1 by adding L3, L4, L5, and L6 based on the content recorded in the handwriting information storage unit 11a. If the erasing determination unit 11d determines that the calculated handwriting length is longer than the predetermined length, then the erasing processing unit 10e calculates the remaining length by subtracting the predetermined length from the calculated handwriting length. The erasing processing unit 10e makes a comparison between the handwriting length L3 from the erasing start point (the written point number 2 of the stroke number 1) to the next point (the written point number 3 of the stroke number 1) and the calculated remaining length. If the handwriting length L3 from the erasing start point (the written point number 2 of the stroke number 1) to the next point (the written point number 3 of the stroke number 1) is longer than the calculated remaining length, the handwriting from the written point number 2 of the stroke number 1 to the next written point number 3 of the stroke number 1 is set as an erasing target and then erased from the display unit 14. Furthermore, a flag is set up. The flag represents that the column "Erasing start point" of the written point number 2 of the stroke number 1 is made blank and then the written point number 3 of the stroke number 1 is set as an erasing starting point. If the handwriting length L3 from the erasing start point (the written point number 2 of the stroke number 1) to the next point (the written point number 3 of the stroke number 1) is shorter than the calculated remaining length, the handwriting length from the written point number 2 of the stroke number 1 to the further next written point number 4 of the stroke number 1 is calculated. The same determination as one described above is repeated based on the handwriting length after the calculation.

In the first embodiment, as described above, the processing for displaying and erasing handwriting is allowed to erase the first displayed portion of the handwriting when the length of the handwriting being displayed exceeds the predetermined length. Therefore, it leads to a decrease in possibility of visually recognizing the input content by any of other persons at the time of inputting letters or characters by hand, thereby improving the security. In other words, it becomes possible to provide a machine interface where the handwriting with a predetermined length is displayed regardless of the writing speed of the input user. Thus, the input user can easily grasp the input state, while any of other persons can hardly recognize the content of the input. In addition, the completion condition and the subsequent processing are appropriately set up so that the handwriting cannot be erased immediately after separating the input member from the handwriting input unit 13. Thus, when input of the next handwriting, it becomes possible to visually recognize the position of the last input handwriting. Such a setup is effective to the case where the number of strokes in the character is great and the individual strokes are short, compared with conventional one.

Second Embodiment

A second embodiment is configured in a manner similar to the first embodiment, except that some points included in the handwriting with erased strokes in the character are displayed as trace points. In the second embodiment, the same structural elements as those in the first embodiment are designated by the same reference numerals to refer to the first embodiment and their detail description will be omitted.

The hardware configuration of the handwriting input device 1 of the second embodiment is the same as that of the first embodiment. Thus, the description of the hardware configuration will be omitted while referring to the first embodiment.

Figure 14:
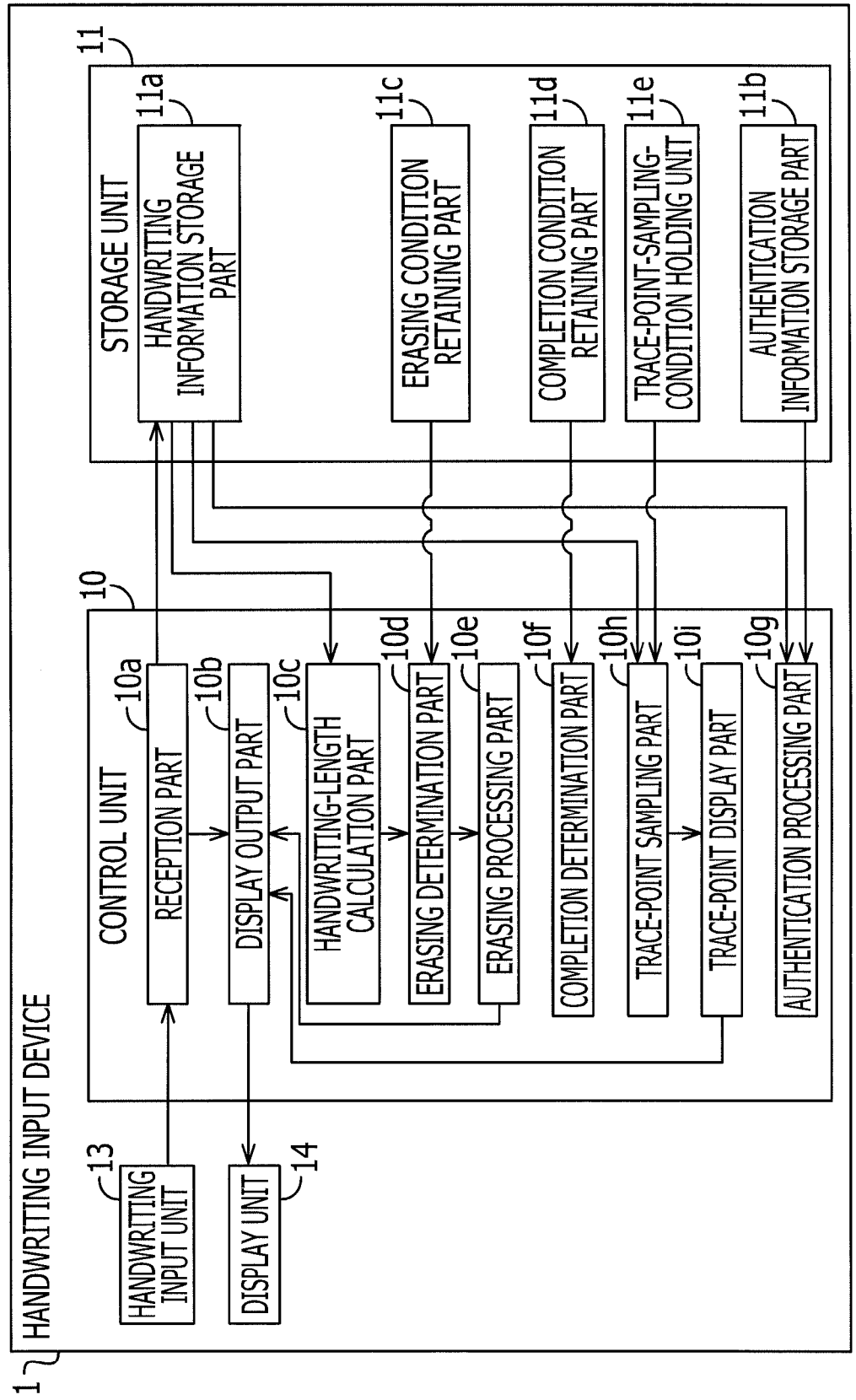
FIG. 14 is a block diagram illustrating an exemplary functional configuration of the handwriting input device according to a second embodiment.

Next, the functional constitution of the handwriting input device 1 according to the second embodiment will be described. FIG. 14 is a block diagram illustrating an exemplary functional configuration of the handwriting input device 1 according to the first embodiment. The handwriting input device 1 executes the handwritten input program PRG under the control of the control unit 10, thereby executing the functions of a reception unit 10a, a display output unit 10b, a handwriting-length calculation unit 10c, an erasing determination unit 10d, an erasing processing unit 10e, a completion determination unit 10f, an authentication processing unit 10g, a trace-point sampling unit 10h, a trace-point display unit 10i, and so on. Alternatively, instead of executing the handwritten input program PRG, circuits that realize functions, such as those of the reception unit 10a, the display output unit 10b, the handwriting-length calculation unit 10c, the erasing determination unit 10d, the erasing processing unit 10e, the completion determination unit 10f, the authentication processing unit 10g, the trace-point sampling unit 10h, and the trace-point display unit 10i, may be incorporated.

The trace-point sampling unit 10h is a structural element, such as a program module or a circuit, which activates the control unit 10 to extract some points included in the erased handwriting as trace points that represent the trace of the erased handwriting. The trace-point sampling unit 10h extracts a starting point and an ending point of one stroke, and a point on the handwriting having predetermined relationship with the positions of the starting point and the ending point as trace points. For example, the point at which the distances from the starting point and the ending point of one stroke and the distance from the straight line passing through the starting point and the ending point become the maximum is extracted as a trace point.

The trace dot display unit 10i is a structural element, such as a program module or a circuit which operates control unit 10 so that the point which 10h of trace-point sampling units extracted may be displayed on display unit 14. The trace-point display unit 10i is a structural element, such as a program module or a circuit, which activates the control unit 10 to allow the display unit 14 to display the point extracted by the trace-point sampling unit 10h. The trace point to be displayed by the processing of the trace-point display unit 10i is output as a display instruction from the display output unit 10b to the display unit 14, thereby displaying the trace point of the display unit 14.

In addition, the handwriting input device 1 executes the handwritten input program RPG based on the control of the control unit 10 to allow the unit of the storage area of the storage unit 11 to be used as a handwriting information storage unit 11a, an authentication information storage unit 11b, an erasing condition retaining unit 11c, a completion condition retaining unit 11d, a trace-point-sampling-condition holding unit 11e, and so on.

The trace-point-sampling-condition holding unit 11e is an information storage area that stores the conditions for extracting a trace point by the trace-point sampling unit 10h. Here, it is not always necessary to secure the trace-point-sampling-condition holding unit 11e as an independent storage area. For example, extraction conditions may be created in a program module which can be executed as a trace-point sampling unit 10h.

Figure 15A:
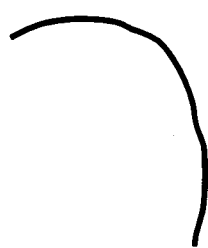
FIGS. 15A and 15B are explanatory diagrams illustrating exemplary processing of a trace-point sampling unit of the handwriting input device according to the second embodiment.
Figure 15B:
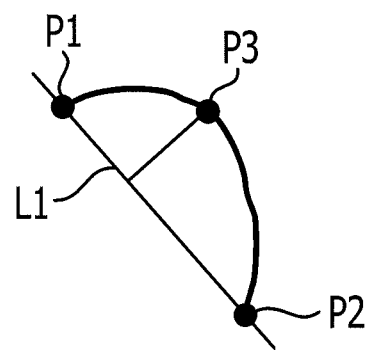

Here, the extraction of a trace point using the trace-point sampling unit 10h, which can act as characteristic processing of the present embodiment, will be described. FIGS. 15A and 15B and FIGS. 16A to 16C are explanatory diagrams showing an example of proceeding performed by the trace-point sampling unit 10h of the handwriting input device 1 of the second embodiment. As the processing of the trace-point sampling unit 10h, description will be made on an example where the point at which the distances from the starting point and the ending point of one stroke and the distance from the straight line passing through the starting point and the ending point become the maximum is extracted as a trace point. FIG. 15A illustrates one stroke in a handwriting accepted to be input. FIG. 15B illustrates the stroke shown in FIG. 15A and points P1 to P3 sampled as trace points from the stroke. The point P1 is the starting point of the stroke and the point P2 is the end point of the stroke. The point P3 is located at the position where the distance from a line L1 passing through the points P1 and P2 becomes the maximum. In the example shown in FIGS. 15A and 15B, the trace-point sampling unit 10h samples points P1 to P3 as trace points.

Figure 16A:
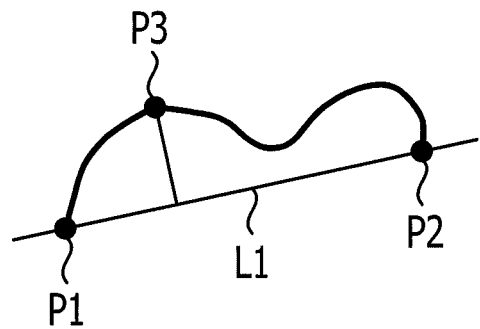
FIGS. 16A to 16C are explanatory diagrams illustrating exemplary processing of a trace-point sampling unit of the handwriting input device according to the second embodiment.
Figure 16B:
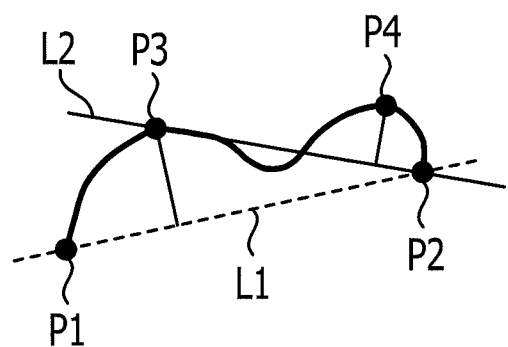
Figure 16C:
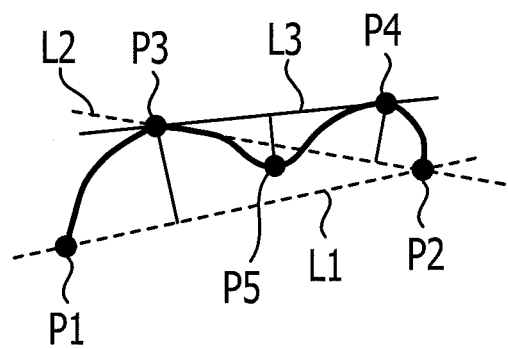

Next, another example will be described. FIG. 16A illustrates one stroke in a stroke in a handwriting accepted to be input, points P1 to P3 sampled as trace points, and a line L1. Trace points P1 to P3 shown in FIG. 16A are points sampled by the same method as that of the example shown in FIGS. 15A and 15B. Further to FIG. 16A, FIG. 16B illustrates an example in which an additional point P4 is further sampled as a trace point. The trace-point sampling unit 10h samples the point P4, which is on the stroke where the distance from a line L2 passing through the end point P2 and the last selected point P3, as a trace point. Further to FIG. 16B, FIG. 16C illustrates an example in which an additional point P5 is further sampled as a trace point. By the same processing as one shown in FIG. 16B, the trace-point sampling unit 10h samples the point P5, which is on the stroke where the distance from a line L3 passing through the point P3 and the point P4, as a trace point. Thus, in the example shown in FIGS. 16A to 16C, the trace-point sampling unit 10h samples points P1 to P5 as trace points.

Here, the number of trace points sampled with respect to the stroke, the method for selecting points to be used for sampling trace points, and other sampling conditions can be suitably defined. In addition, the defined conditions can be stored in the trace-point sampling condition holding unit 11e. In addition, the sampling method is not limited to one described using FIGS. 15A and 15B and FIGS. 16A to 16C. Alternatively, the sampling method may be suitably defined. For example, a point every predetermined handwriting length may be sampled as a trace point.

Next, the main processing of the handwriting input device 1 according to the second embodiment of the present application will be described. FIG. 17 is a flow chart illustrating an exemplary representation of handwriting and exemplary erasing processing of the handwriting input device 1 according to the second embodiment.

The handwriting input device 1 executes the handwriting representation and the erasing processing as described below when the input of handwriting is accepted under the controls of the control unit 10 that executes the handwritten input program PRG. Since the processing in S101 to S108 is the same as the processing for displaying and erasing handwriting of the first embodiment described with reference to FIG. 5 and thus the description thereof will be omitted while referring to the first embodiment.

In S108, after erasing the remaining handwriting being displayed on the display unit 14, the control unit 10 allows the erasing processing unit 10e to erase trace points being displayed on the display unit 14 (S301).

The control unit 10 allows the trace-point sampling unit 10h to sample some points in the erased handwriting by the unit of the stroke as trace points (S302). The trace points sampled in S302 are those sampled based on the information of the stroke obtained from the handwriting information storage unit 11a.

The control unit 10 allows the trace-point display unit 10i to display the trace points sampled by the trace-point sampling unit 10h on the display unit 14 (S303).

In S301, if there is no trace point to be erased, or, for example, if the stroke of the handwriting eliminated in S107 is the first stroke, there is no eliminating target. Thus, substantially, the processing in S301 is not performed. In S302, a trace point is sampled only from the handwriting of the erased stroke by the processing of the last S107. Therefore, by performing the processing in S301 to S303, the point sampled from the handwriting of the last erased stroke is only displayed as a trace point.

Subsequently, the processing for displaying and erasing handwriting is ended. Therefore, the processing for displaying and erasing handwriting of the second embodiment can be performed as described above.

Next, specific examples for application of the handwriting input device 1 according to the second embodiment will be described. FIGS. 18A to 18F and FIGS. 19G to 19L are explanatory diagrams illustrating the states of an exemplary input of the handwriting input device 1 according to the first embodiment, respectively. Where the handwriting input device 1 is configured as an integrated combination of the handwriting input unit 13 and the display unit 14, FIGS. 18A to 18F and FIGS. 19G to 19L illustrate handwriting and a stylus pen as an input member displayed on the display unit 14. In FIGS. 18A to 18F and FIGS. 19G to 19L, the handwriting being displayed is represented by a solid line and the erased handwriting is represented by a dashed line. In the figure, a black circle represents each of the trace points.

Figure 18:
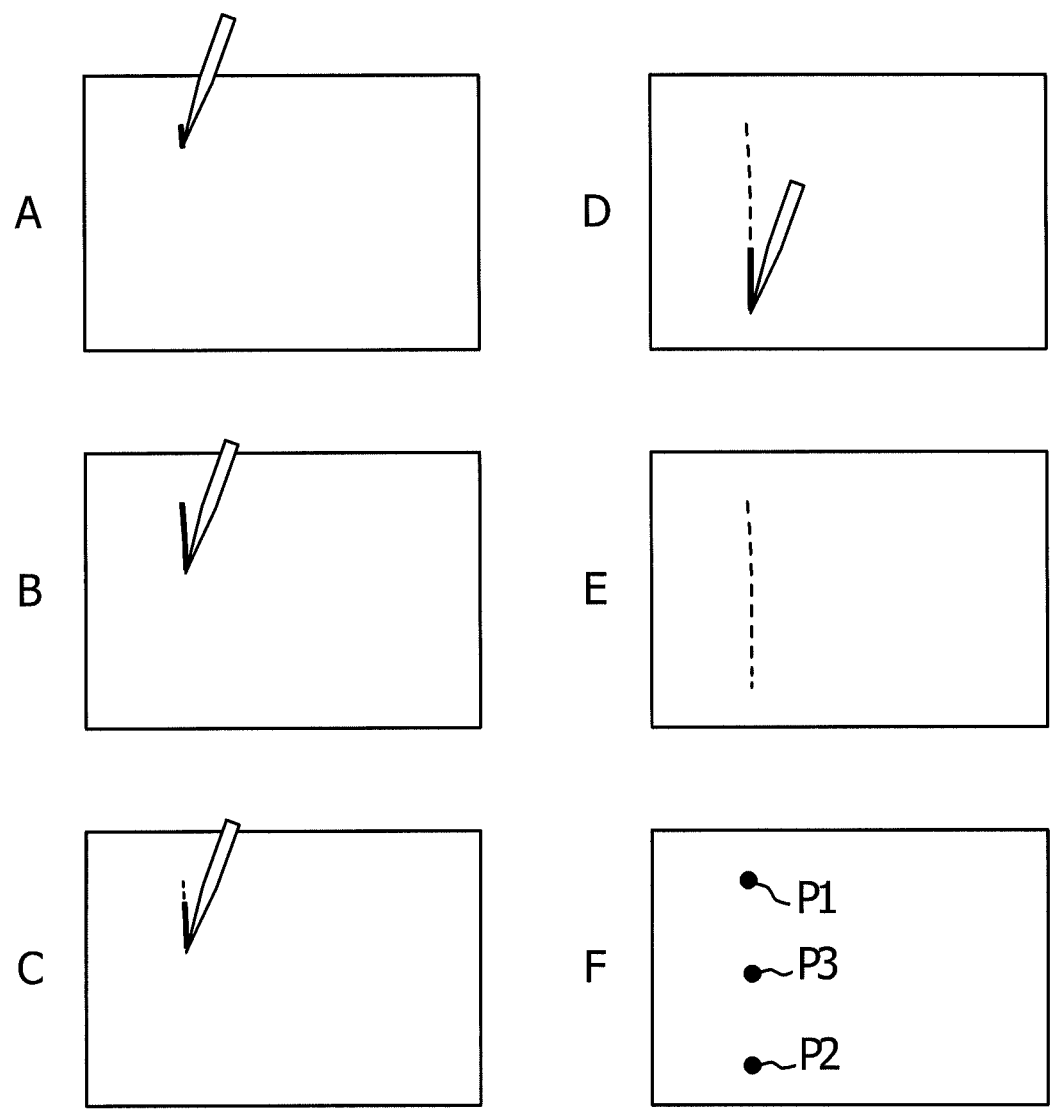
FIGS. 18A to 18F are explanatory diagrams illustrating an exemplary input state of the handwriting input device of the second embodiment.

FIGS. 18A to 18F and FIGS. 19G to 19L show the states where the Japanese character "□" (mouth in English) is written by hand, respectively. FIG. 18A shows the state where the reception of an input of a vertical line, the first stroke in the character "□" (mouth in English), is started. From FIG. 18A to FIG. 18B, there is shown a state where the reception of the vertical line input is continued and the vertical line is displayed as a handwriting. From FIG. 18C to FIG. 18D, there is shown a state where the handwriting length of the vertical line exceeds the predetermined length and the portions of the handwriting is erased from one displayed first. FIG. 18E shows the state when the input member is separated from the handwriting input unit 13 and the displayed handwriting is erased. FIG. 18F shows the state where trace points P1 to P3 sampled from the handwriting erased in FIG. 18E. The trace points P1, P2, and P3 shown in FIG. 18F are the starting point, the end point, and the middle point on the handwriting of the first stroke, respectively.

Figure 19:
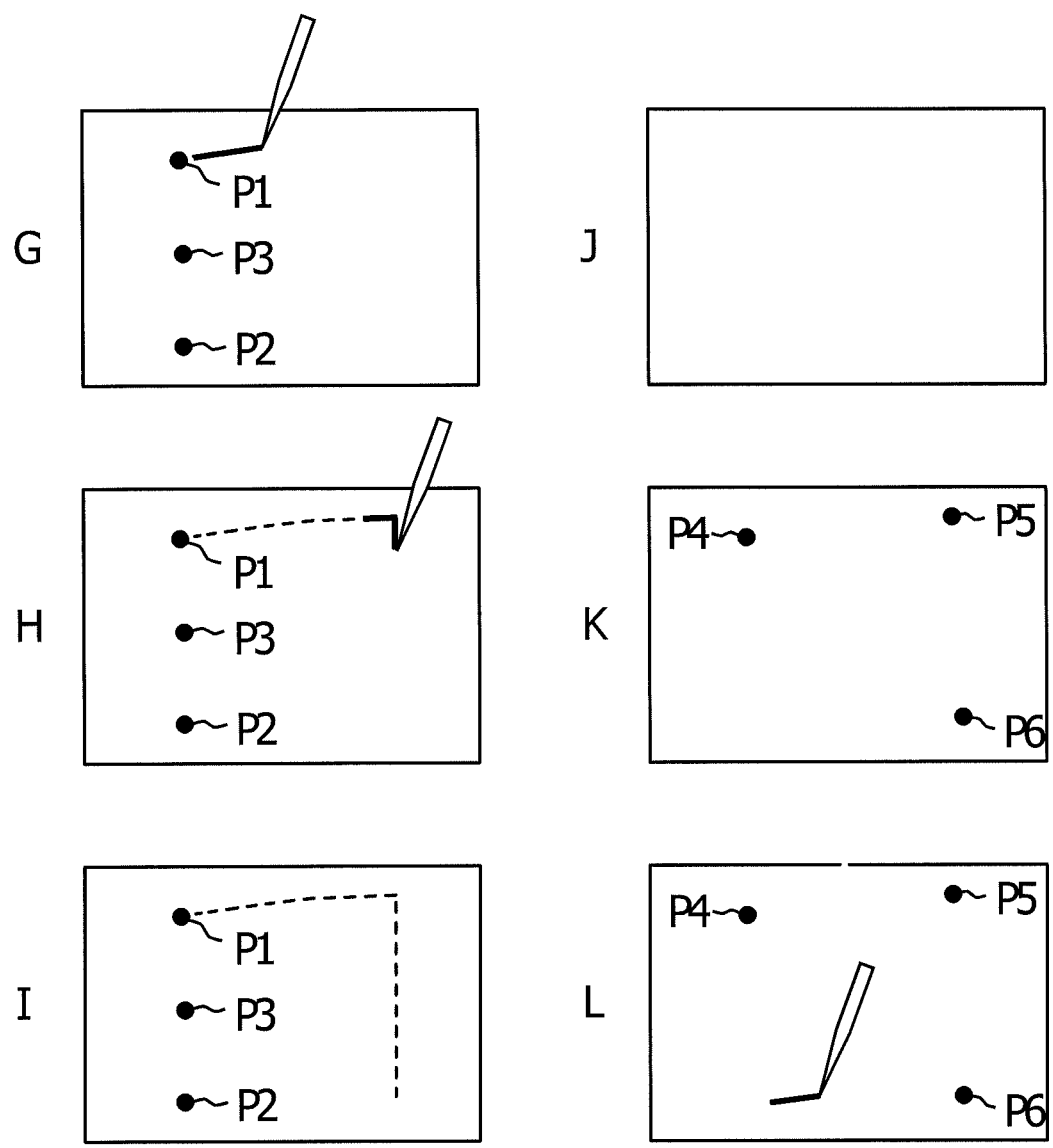
FIGS. 19G to 19L are explanatory diagrams illustrating the states of an exemplary input of the handwriting input device of the second embodiment, respectively.

FIG. 19G represents a state when the reception of an input of a second stroke is started. Since the trace points P1 to P3 are being displayed when inputting the second stroke, the input user can recognize the position where the handwriting of the first stroke has been displayed. FIG. 19H shows the state where the handwriting length of the second stroke exceeds the predetermined length and the portions of the handwriting are erased from one displayed first. FIG. 19I shows the state when the input member is separated from the handwriting input unit 13 and the displayed handwriting is erased. FIG. 19J shows the state where the displayed trace points P1 to P3 are erased after FIG. 19I. FIG. 19K shows the state where only the trace points P4 to P6 sampled from the last erased handwriting, or the handwriting of the second stroke, are displayed after FIG. 19J. FIG. 19L represents a state when the reception of an input of a third stroke is started. The trace points P4, P5, and P6 shown in FIG. 19L are the starting point, the end point, and the middle point on the handwriting of the second stroke, respectively. Since the trace points P4 to P6 of the second are being displayed when inputting the third stroke, the input user can recognize the position where the handwriting of the second stroke has been displayed.

FIGS. 20A to 20F and FIGS. 21G to 21L are explanatory diagrams illustrating the states of an exemplary input of the handwriting input device 1 according to the first embodiment, respectively. Where the handwriting input device 1 is configured as an integrated combination of the handwriting input unit 13 and the display unit 14, FIGS. 20A to 20F and FIGS. 21G to 21L illustrate handwriting and a stylus pen as an input member displayed on the display unit 14. In FIGS. 20A to 20F and FIGS. 21G to 21L, the handwriting being displayed is represented by a solid line and the erased handwriting is represented by a dashed line. In the figure, a black circle represents each of the trace points.

Figure 20:
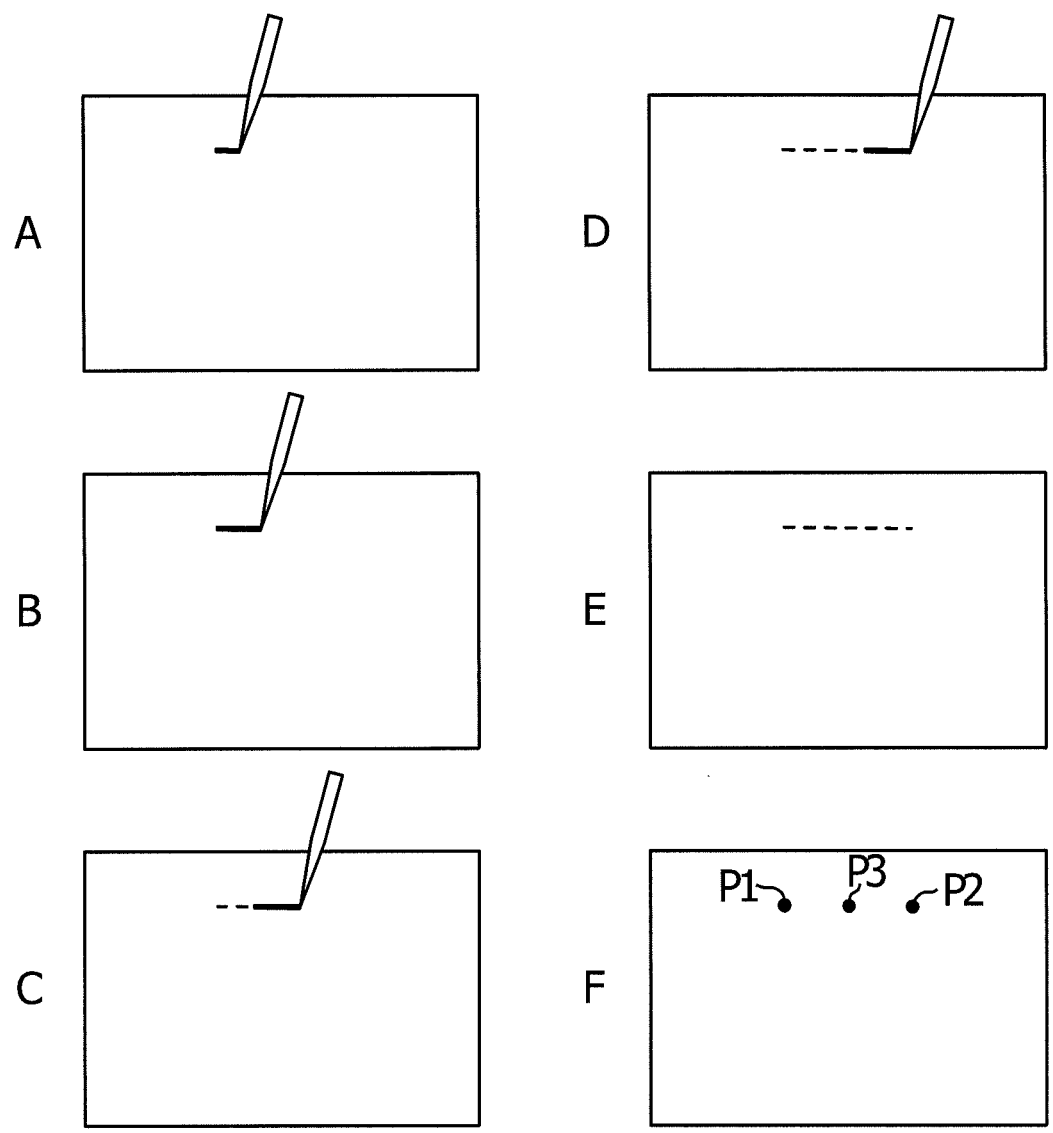
FIGS. 20A to 20F are explanatory diagrams illustrating the states of an exemplary input of the handwriting input device of the second embodiment.

FIGS. 20A to 20F and FIGS. 21G to 21L show a state where the alphabetic letter "F" is written by hand. FIG. 20A shows the state where the reception of an input of the first stroke in the letter "F" is started. From FIG. 20A to FIG. 20B, there is shown a state where the reception of the first stroke input is continued and the first stroke is displayed as a handwriting. From FIG. 20C to FIG. 20D, there is shown a state where the handwriting length of the first stroke exceeds the predetermined length and the portions of the handwriting is erased from one displayed first. FIG. 20E shows the state when the input member is separated from the handwriting input unit 13 and the displayed handwriting is erased. FIG. 20F shows the state where trace points P1 to P3 sampled from the handwriting erased in FIG. 20E. The trace points P1, P2, and P3 shown in FIG. 20F are the starting point, the end point, and the middle point on the handwriting of the first stroke, respectively.

Figure 21:
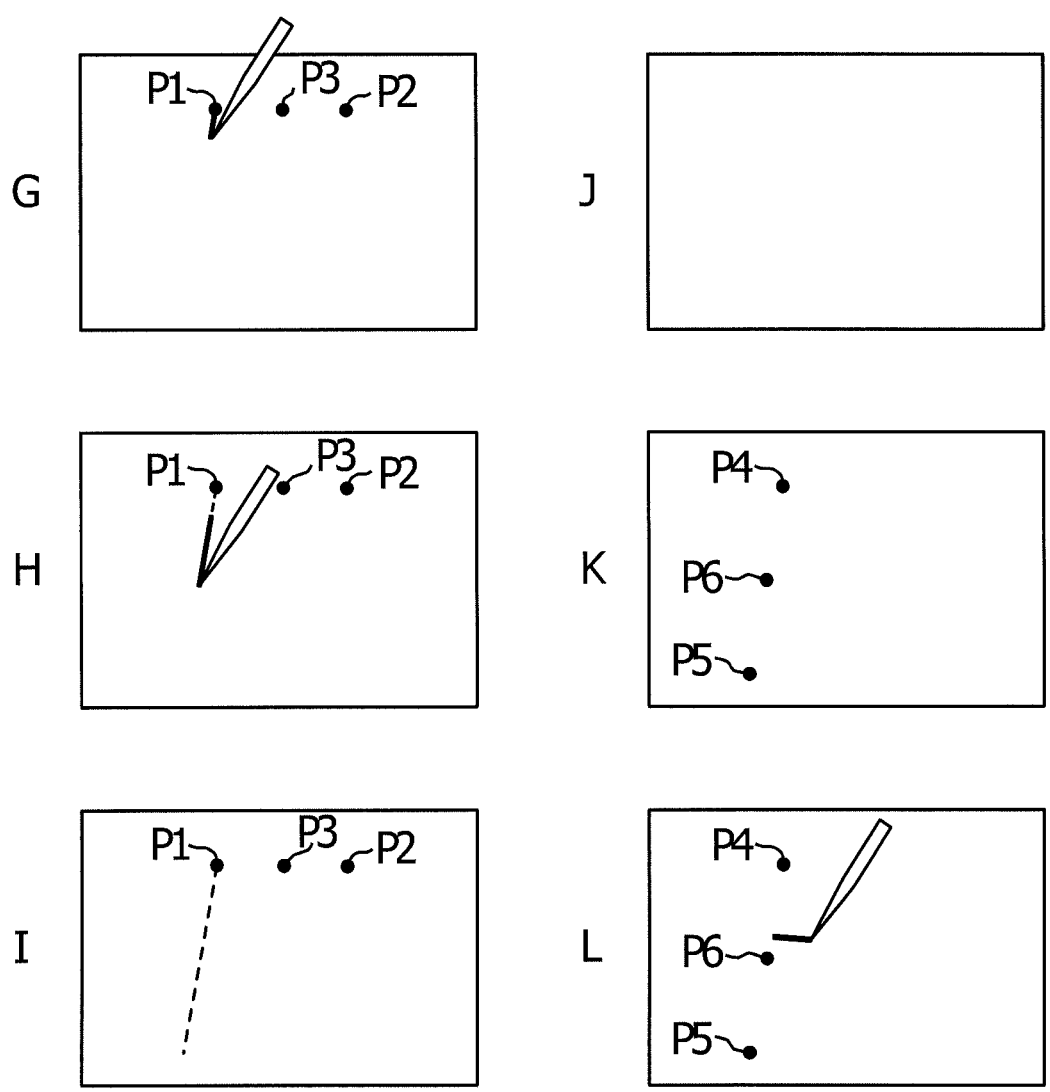
FIGS. 21G to 21L are explanatory diagrams illustrating the states of an exemplary input of the handwriting input device of the second embodiment.

FIG. 21G represents a state when the reception of an input of a second stroke is started. Since the trace points P1 to P3 are being displayed when inputting the second stroke, the input user can recognize the position where the handwriting of the first stroke has been displayed. FIG. 21H shows the state where the handwriting length of the second stroke exceeds the predetermined length and the portions of the handwriting are erased from one displayed first. FIG. 21I shows the state when the input member is separated from the handwriting input unit 13 and the displayed handwriting is erased. FIG. 21J shows the state where the displayed trace points P1 to P3 are erased after FIG. 21I. FIG. 21K shows the state where only the trace points P4 to P6 sampled from the last erased handwriting, or the handwriting of the second stroke, are displayed after FIG. 21J. The trace points P4, P5, and P6 shown in FIG. 21K are the starting point, the end point, and the middle point on the handwriting of the second stroke, respectively. FIG. 21L represents a state when the reception of an input of a third stroke is started. Since the trace points P4 to P6 of the second are being displayed when inputting the third stroke, the input user can recognize the position where the handwriting of the second stroke has been displayed.

Here, for example, the time to erase trace points can be suitably set so that only last two-stroke trace points can be displayed. In this case, the time to erase the corresponding handwriting may be also included.

As described above, in the second embodiment, as the processing for displaying and erasing handwriting, some of points included in the erased handwriting is selected and the selected points are then displayed. Therefore, there is an advantage in that an approximate position of the eliminated handwriting can be grasped because the typical point of the handwriting input by the input user him/herself can be displayed. In addition, there is another advantage in that any of other persons hardly deduce the input content because only some points are displayed. For example, when inputting alphabets, a cursive-handwriting input is suitable for the first embodiment but a block-letter input for the second embodiment.

Third Embodiment

A third embodiment is designed as a certain circumscribed graphic form that circumscribes a handwriting corresponding to an erased stroke in the first embodiment. In the third embodiment, the same structural elements as those in the first embodiment are designated by the same reference numerals to refer to the first embodiment and their detail description will be omitted.

The hardware configuration of the handwriting input device 1 of the third embodiment is the same as that of the first embodiment, so that the description of the hardware configuration will be omitted while referring to the first embodiment.

Figure 22:
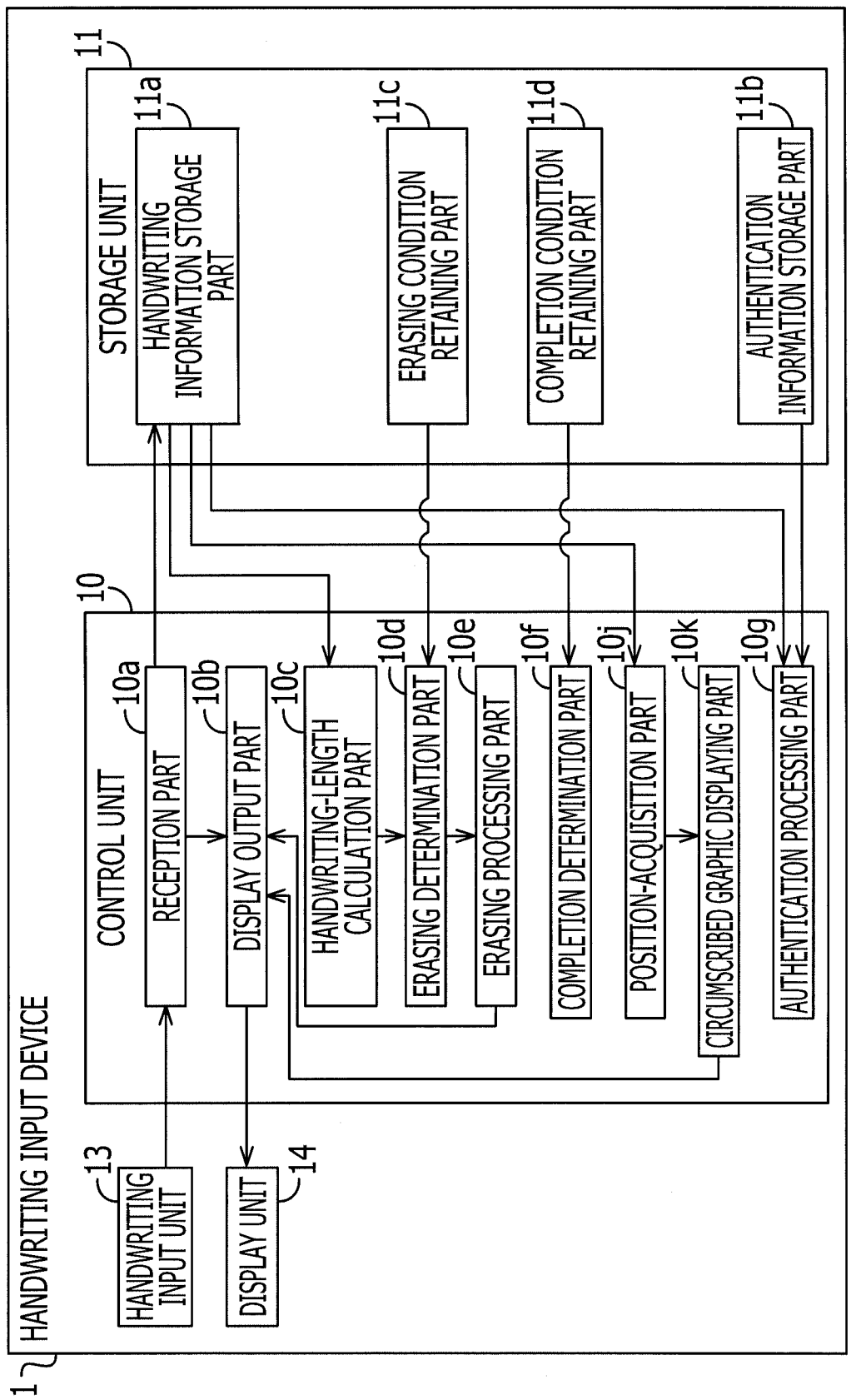
FIG. 22 is a block diagram illustrating an exemplary functional configuration of the handwriting input device according to a third embodiment.

Next, the functional constitution of the handwriting input device 1 according to the third embodiment will be described. FIG. 22 is a block diagram illustrating an exemplary functional configuration of the handwriting input device 3 according to the first embodiment. The handwriting input device 1 executes the handwritten input program PRG under the control of the control unit 10, thereby executing the functions of a reception unit 10a, a display output unit 10b, a handwriting-length calculation unit 10c, an erasing determination unit 10d, an erasing processing unit 10e, a completion determination unit 10f, an authentication processing unit 10g, a position-acquisition unit 10j, a circumscribed graphic displaying unit 10k, and so on. Alternatively, in stead of executing the handwritten input program PRG, circuits that realize functions, such as those of the reception unit 10a, the display output unit 10b, the handwriting-length calculation unit 10c, the erasing determination unit 10d, the erasing processing unit 10e, the completion determination unit 10f, the authentication processing unit 10g, the position-acquisition unit 10j, and the circumscribed graphic displaying unit 10k, may be incorporated.

The position-acquisition unit 10j is a structural element, such as a program module or a circuit, which activates the control unit 10 to acquire the position at which the erased handwriting has been displayed on the display unit 14. The position-acquisition unit 10j acquires coordinates as a position where the erased handwriting by the unit of the stroke was displayed.

The circumscribed graphic displaying unit 10k is a structural element, such as a program module or a circuit, which activates the control unit 10 to display the graphic form circumscribed on the erased handwriting on the display unit 14, based on the position acquired by the position-acquisition unit 10j. The circumscribed graphic form to be displayed by the processing of the circumscribed graphic displaying unit 10k is output as a display instruction from the display output unit 10b to the display unit 14, thereby displaying the circumscribed graphic form on the display unit 14. Examples of the circumscribed graphic form include a circle, an ellipse, such as a circle, an oval, and an ellipse as well as polygons, such as a rectangle. In the following description, a rectangular window for input of handwriting is displayed on the display unit 14. Then, a rectangle made of four sides in parallel with the frame that forms the windows.

In addition, the handwriting input device 1 executes the handwritten input program RPG based on the control of the control unit 10 to allow the unit of the storage area of the storage unit 11 to be used as a handwriting information storage unit 11a, an authentication information storage unit 11b, an erasing condition retaining unit 11c, a completion condition retaining unit 11d, and so on.

Figure 23:
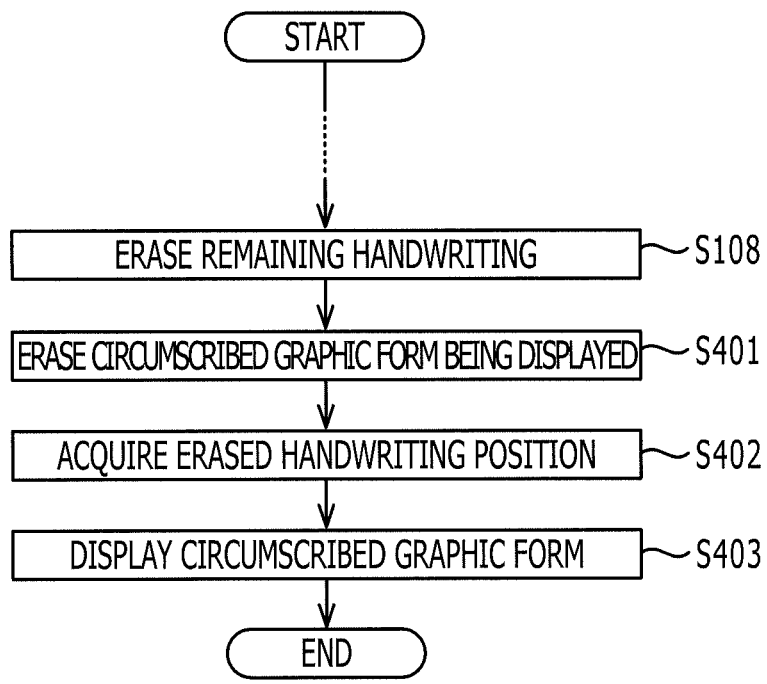
FIG. 23 is a flow chart illustrating an exemplary representation of handwriting and exemplary erasing processing of the handwriting input device according to the third embodiment.

Next, the main processing of the handwriting input device 1 according to the third embodiment of the present application will be described. FIG. 23 is a flow chart illustrating an exemplary representation of handwriting and exemplary erasing processing of the handwriting input device 1 according to the third embodiment.

The handwriting input device 1 executes the handwriting representation and the erasing processing as described below when the input of handwriting is accepted under the controls of the control unit 10 that executes the handwritten input program PRG. The processing in S101 to S108 is the same as the example of processing described in the first embodiment with reference to FIG. 5, so that the descriptions thereof will be omitted while referring to the first embodiment.

In S108, after erasing the remaining handwriting being displayed on the display unit 14, the control unit 10 allows the erasing processing unit 10e to erase the circumscribed graphic form being displayed on the display unit 14 (S401).

The control unit 10 acquires the position where the erased handwriting by the unit of the stroke has been displayed by the position-acquisition unit 10j (S402). The position acquired at S402 may be, for example, the coordinates of the handwriting corresponding to the erased stroke. In addition, the coordinates of the handwriting can be acquired from the handwriting information storage unit 11a. It is not necessary to acquire all the coordinates of the handwriting corresponding to the stroke concerned. It may be allowed to acquire only coordinates required for specifying the circumscribed graphic form. For example, when the rectangular coordinate system shown by the X coordinate and the Y coordinate is used, the circumscribed graphic form being set to a rectangle can be specified by acquiring the maximum and minimum X coordinates and the maximum and minimum Y coordinates from the coordinates of the intended handwriting.

The control unit 10 allows the circumscribed graphic displaying unit 10k to display the circumscribed graphic form, which circumscribes the erased handwriting, on the display unit 14 based on the position acquired by the position-acquisition unit 10j (S403).

In S401, if there is no circumscribed graphic form to be erased (e.g., if the stroke corresponding to the erased handwriting in S108 is the first stroke), there is no target to be erased. Thus, the processing of S401 is not performed substantially. In S402, the position is acquired only from the handwriting corresponding to the erased stroke by the processing in the last S108. Therefore, only the circumscribed graphic form circumscribed to the handwriting corresponding to the last erased stroke will be displayed by processing of S401-S403.

Subsequently, the processing for displaying and erasing handwriting is ended. Thus, the processing for displaying and erasing handwriting according to the third embodiment can be executed.

Next, specific examples for application of the handwriting input device 1 according to the third embodiment will be described. FIGS. 24A to 24F are explanatory diagrams illustrating the states of an exemplary input of the handwriting input device 1 of the third embodiment, respectively. Where the handwriting input device 1 is configured as an integrated combination of the handwriting input unit 13 and the display unit 14, FIGS. 24A to 24F illustrates handwriting and a stylus pen as an input member displayed on the display unit 14. In FIGS. 24A to 24F, the handwriting and the circumscribed graphic form being displayed are represented by solid lines and the erased handwriting is represented by a dashed line.

Figure 24:
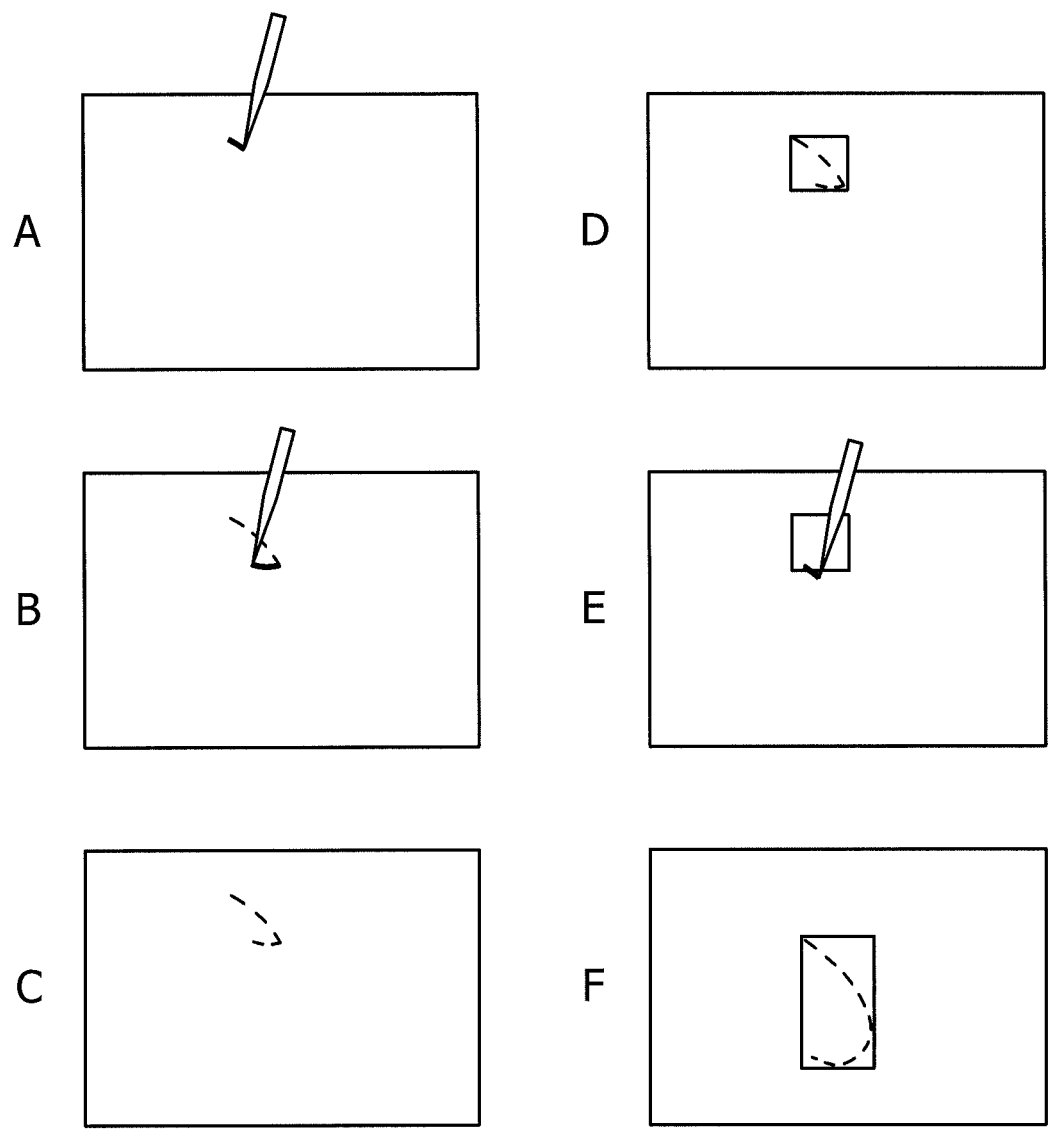
FIGS. 24A to 24F are explanatory diagrams illustrating the states of an exemplary input of the handwriting input device of the third embodiment.

FIGS. 24A to 24F illustrate the states of handwritten input of a certain Japanese character (the character shown in FIGS. 24A to 24F is different from one shown in FIGS. 3A to 3D or FIG. 7), respectively. FIG. 24A shows the state where the reception of an input of the first stroke in the Japanese character is started. FIG. 24B shows the state where the handwriting length of the second stroke exceeds the predetermined length and the portions of the handwriting is erased from one displayed first. FIG. 24C shows the state when the input member is separated from the handwriting input unit 13 and the displayed handwriting is erased. FIG. 24D shows the state where the circumscribed graphic form circumscribed to the position acquired from the handwriting eliminated in FIG. 24C is displayed.

FIG. 24E represents a state when the reception of an input of a second stroke is started. Since the rectangle is being displayed as a circumscribed graphic form when inputting the second stroke, the input user can recognize the position where the handwriting of the first stroke has been displayed. FIG. 24F shows a circumscribed graphic form to be displayed after completing the input of the second stroke and separating the input member from the handwriting input unit 13. Upon completing the input of the second stroke and separating the input member from the handwriting input unit 13, the circumscribed graphic form corresponding to the first stroke handwriting is eliminated. As a result, only the circumscribed graphic form corresponding to the second stroke handwriting is displayed.

FIGS. 25A to 25F are explanatory diagrams illustrating the sates of an exemplary input of the handwriting input device 1 of the third embodiment, respectively. Where the handwriting input device 1 is configured as an integrated combination of the handwriting input unit 13 and the display unit 14, FIGS. 25A to 25F illustrate handwriting and a stylus pen as an input member displayed on the display unit 14. In FIGS. 25A to 25F, the handwriting and the circumscribed graphic form being displayed are represented by solid lines and the erased handwriting is represented by a dashed line.

Figure 25:
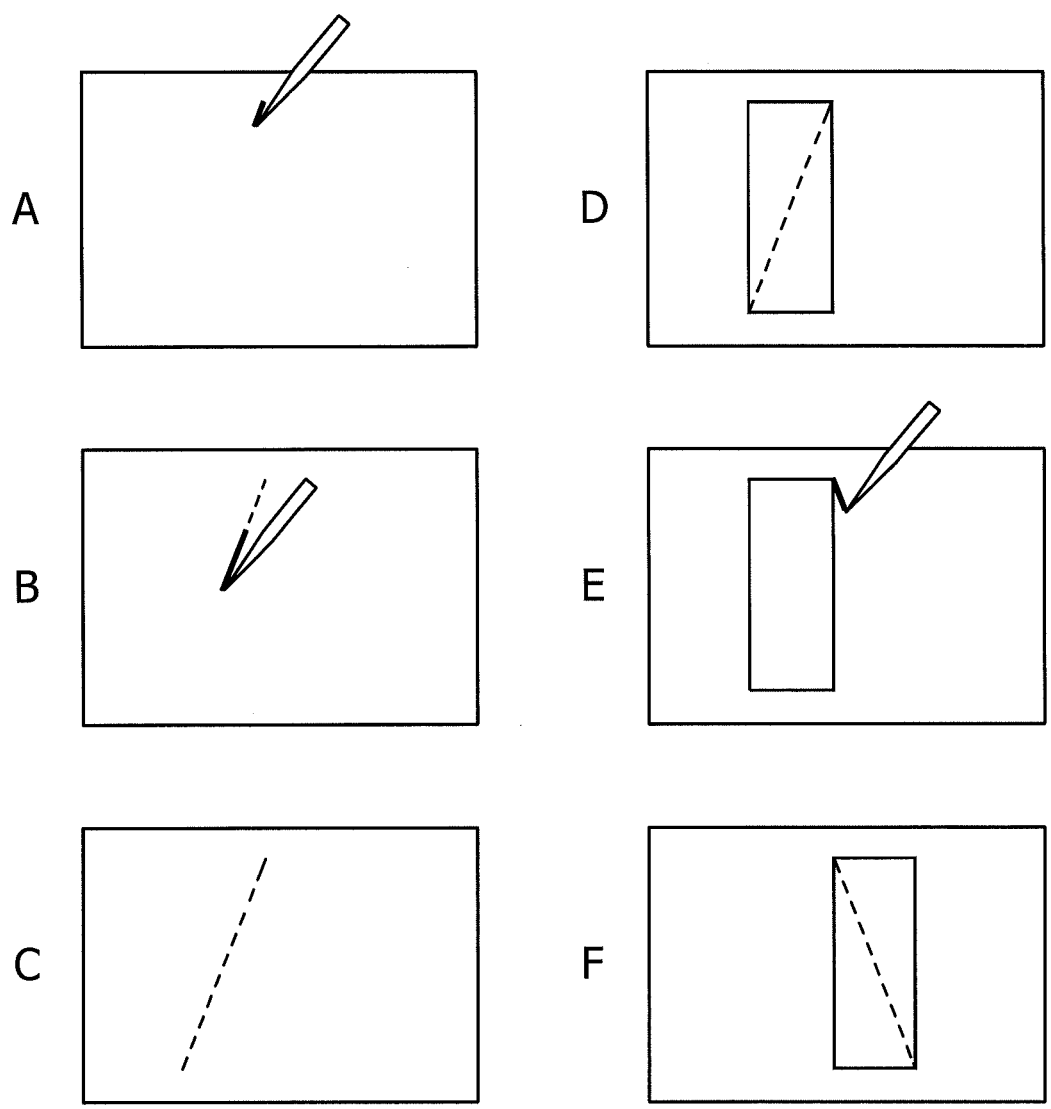
FIGS. 25A to 25F are explanatory diagrams illustrating the states of an exemplary input of the handwriting input device of the third embodiment.

The states in which the alphabetic letter "A" is written by hand are shown in FIGS. 25A to 25F, respectively. FIG. 25A shows the state where the reception of an input of the first stroke in the letter "A" is started. FIG. 25B shows the state where the handwriting length of the second stroke exceeds the predetermined length and the portions of the handwriting is erased from one displayed first. FIG. 25C shows the state when the input member is separated from the handwriting input unit 13 and the displayed handwriting is erased. FIG. 25D shows the state where the circumscribed graphic form circumscribed to the position acquired from the handwriting eliminated in FIG. 25C is displayed.

FIG. 25E represents a state when the reception of an input of a second stroke is started. Since the rectangle is being displayed as a circumscribed graphic form when inputting the second stroke, the input user can recognize the position where the handwriting of the first stroke has been displayed. FIG. 25F shows a circumscribed graphic form to be displayed after completing the input of the second stroke and separating the input member from the handwriting input unit 13. Upon completing the input of the second stroke and separating the input member from the handwriting input unit 13, the circumscribed graphic form corresponding to the first stroke handwriting is eliminated. As a result, only the circumscribed graphic form corresponding to the second stroke handwriting is displayed.

Here, for example, the time to display the circumscribed graphic form can be suitably set so that only last two-stroke trace points can be displayed. In this case, the time to erase the corresponding handwriting may be also included.

As described above, in the third embodiment, as the processing for displaying and erasing handwriting, the circumscribed graphic form that circumscribes the erased handwriting is displayed. Therefore, there is an advantage in that an approximate position of the eliminated handwriting can be grasped because the circumscribed graphic form that circumscribes the handwriting input by the input user him/herself can be displayed. In addition, there is another advantage in that any of other persons hardly deduce the input content because the external frame of the graphic form is displayed.

Fourth Embodiment

A fourth embodiment is configured in a manner similar to the first embodiment, except that the handwriting corresponding to the erased stroke is represented with a color different from the display color of the handwriting. In the fourth embodiment, the same structural elements as those in the first embodiment are designated by the same reference numerals to refer to the first embodiment and their detail description will be omitted.

The hardware configuration of the handwriting input device 1 of the fourth embodiment is the same as that of the first embodiment, so that the description of the hardware configuration will be omitted while referring to the first embodiment.

Figure 26:
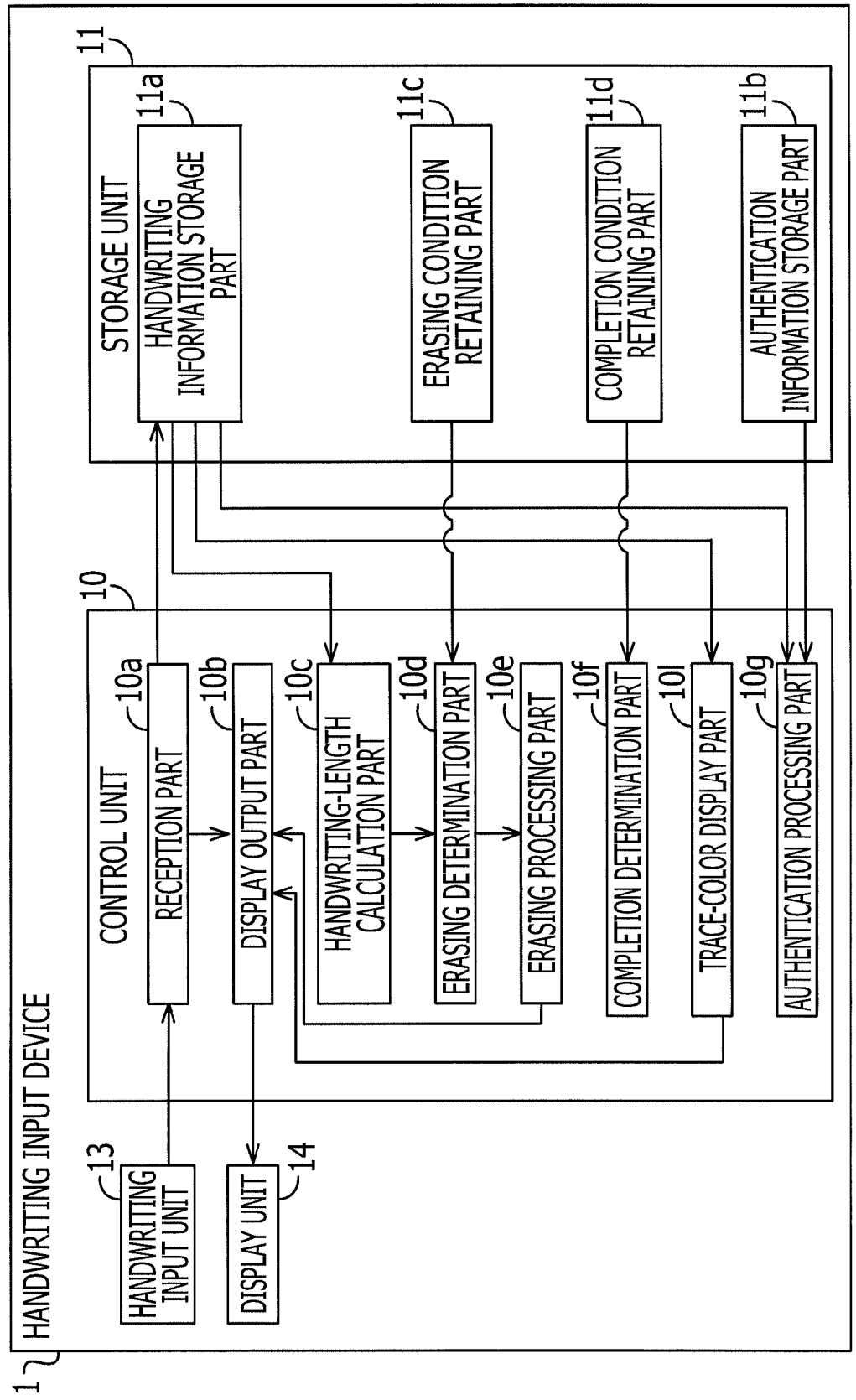
FIG. 26 is a block diagram illustrating an exemplary functional configuration of the handwriting input device according to a fourth embodiment.

Next, the functional configuration of the handwriting input device 1 of the fourth embodiment will be described. FIG. 26 is a block diagram illustrating an exemplary functional configuration of the handwriting input device 1 according to the fourth embodiment. The handwriting input device 1 executes the handwritten input program PRG under the control of the control unit 10, thereby executing the functions of a reception unit 10*a*, a display output unit 10*b*, a handwriting-length calculation unit 10*c*, an erasing determination unit 10*d*, an erasing processing unit 10*e*, a completion determination unit 10*f*, an authentication processing unit 10*g*, a trace-color display unit 10*l*, and so on. Alternatively, instead of executing the handwritten input program PRG, circuits that realize functions, such as those of the reception unit 10*a*, the display output unit 10*b*, the handwriting-length calculation unit 10*c*, the erasing determination unit 10*d*, the erasing processing unit 10*e*, the completion determination unit 10*f*, the authentication processing unit 10*g*, and the trace-color display unit 10*l* may be incorporated.

The trace-color display unit 10*l* is a structural element, such as a program module or a circuit, which activates the control unit 10 to display the erased handwriting with a trace-display color which is different from the background color and the display color which has been used for displaying the handwriting. The handwriting with the trace-color display to be displayed by the processing of the trace-color display unit 10*l* is output as a display instruction from the display output unit 10*b* to the display unit 14, thereby displaying the trace point of the display unit 14. It is desirable to use an approximate color which is hardly distinguished from the background color. If the approximate color of the background color is applied to the trace display color, the difference between the background color and the trace display color can be visually confirmed. However, viewing from a distance, it becomes difficult to confirm such a difference. Therefore, the input user taking a cross-look at the display unit 14 can visually confirm the handwriting represented by the trace display color. In contrast, any of other persons viewing the display unit 14 from a location more far than the input user can hardly visually recognize the handwriting being displayed with the trace-display color.

An example of setting the next trace color will be described. If a color to be displayed on the display unit 14 is represented using red (R), green (G), and blue (B) components with a 256-level gray scale, the lightness of the color can be defined by the following equation 3:

$$\{(R \times 299)+(G \times 587)+(B \times 114)\}/1000 \qquad \text{Equation 3}$$

wherein R represents the gray level of the R component; G represents the gray level of the G component; and B represents the gray level of the B component.

The trace-display color is set so that The difference between the lightness of the background color and the lightness of the trace-display color, which are calculated by the above equation 3 will be of less than a predetermined level of 125 or the like. For example, if the trace-display color is set to RGB (229, 115, 58) obtained by reducing about 10% for the respective colors from the background of RGB (255, 128, 64), the difference between the brightness levels is 166−143=23, which is less than a predetermined level of 125. Here, the difference between the lightness of the background color and the lightness of the display color is preferably set to 500 or more. Alternatively, instead of using the difference between the lightness levels with the above equation 3, it is possible to set on the basis of any of various definitions, such as one in which the color difference based on the gray levels of the respective RGB components or the like. However, the ease of recognition from the background color may be affected by various factors, such as individual variance, the setting position of the display unit 14, and so on. Thus, it is preferable that the setting may be suitably performed.

In addition, the handwriting input device 1 executes the handwritten input program RPG based on the control of the control unit 10 to allow the unit of the storage area of the storage unit 11 to be used as a handwriting information storage unit 11a, an authentication information storage unit 11b, an erasing condition retaining unit 11c, a completion condition retaining unit 11d, and so on.

Figure 27:
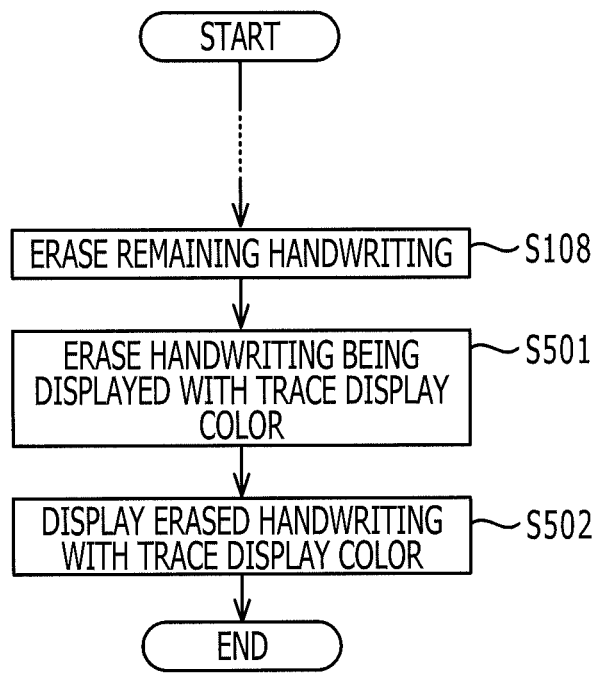
FIG. 27 is a flow chart illustrating an exemplary representation of handwriting and exemplary erasing processing of the handwriting input device according to the fourth embodiment.

Next, the main processing of the handwriting input device 1 according to the fourth embodiment of the present application will be described. FIG. 27 is a flow chart illustrating an exemplary representation of handwriting and exemplary erasing processing of the handwriting input device 1 according to the fourth embodiment.

The handwriting input device 1 executes the handwriting representation and the erasing processing as described below when the input of handwriting is accepted under the controls of the control unit 10 that executes the handwritten input program PRG. The processing in S101 to S108 is the same as the example of processing described in the first embodiment with reference to FIG. 5, so that the descriptions thereof will be omitted while referring to the first embodiment.

In S108, after erasing the remaining handwriting being displayed on the display unit 14, the control unit 10 allows the erasing processing unit 10e to erase the trace-display colored handwriting being displayed on the display unit 14 (S501).

The control unit 10 allows the trace-color display unit 10l to display the erased handwriting by the unit of the stroke with the defined trace-display color on the display unit 14 (S502).

In S502, the handwriting is displayed based on the information about the handwriting obtained from the handwriting information storage unit 11a.

In S501, if there is no trace-display color to be erased, or, for example, if the stroke of the handwriting eliminated in S108 is the first stroke, there is no eliminating target. Thus, substantially, the processing in S501 is not performed. In S502, only the handwriting corresponding to the stroke erased by the processing in the last S108 is displayed using the trace-display color. Therefore, by performing the processing in S501 to S502, only the handwriting corresponding to the last erased stroke is displayed.

Subsequently, the processing for displaying and erasing handwriting is ended. Thus, the processing for displaying and erasing handwriting according to the fourth embodiment can be executed.

Next, specific examples for application of the handwriting input device 1 according to the fourth embodiment will be described. FIGS. 28A to 28F are explanatory diagrams illustrating the handwriting input device 1 of the fourth embodiment. Where the handwriting input device 1 is configured as an integrated combination of the handwriting input unit 13 and the display unit 14, FIGS. 28A to 28F illustrate handwriting and a stylus pen as an input member displayed on the display unit 14. In FIGS. 28A to 28F, the handwriting being displayed is represented by a solid line and the erased handwriting is represented by a dashed line. In addition, the handwriting being displayed with the trace-display color is represented by a dashed-dotted line.

Figure 28:
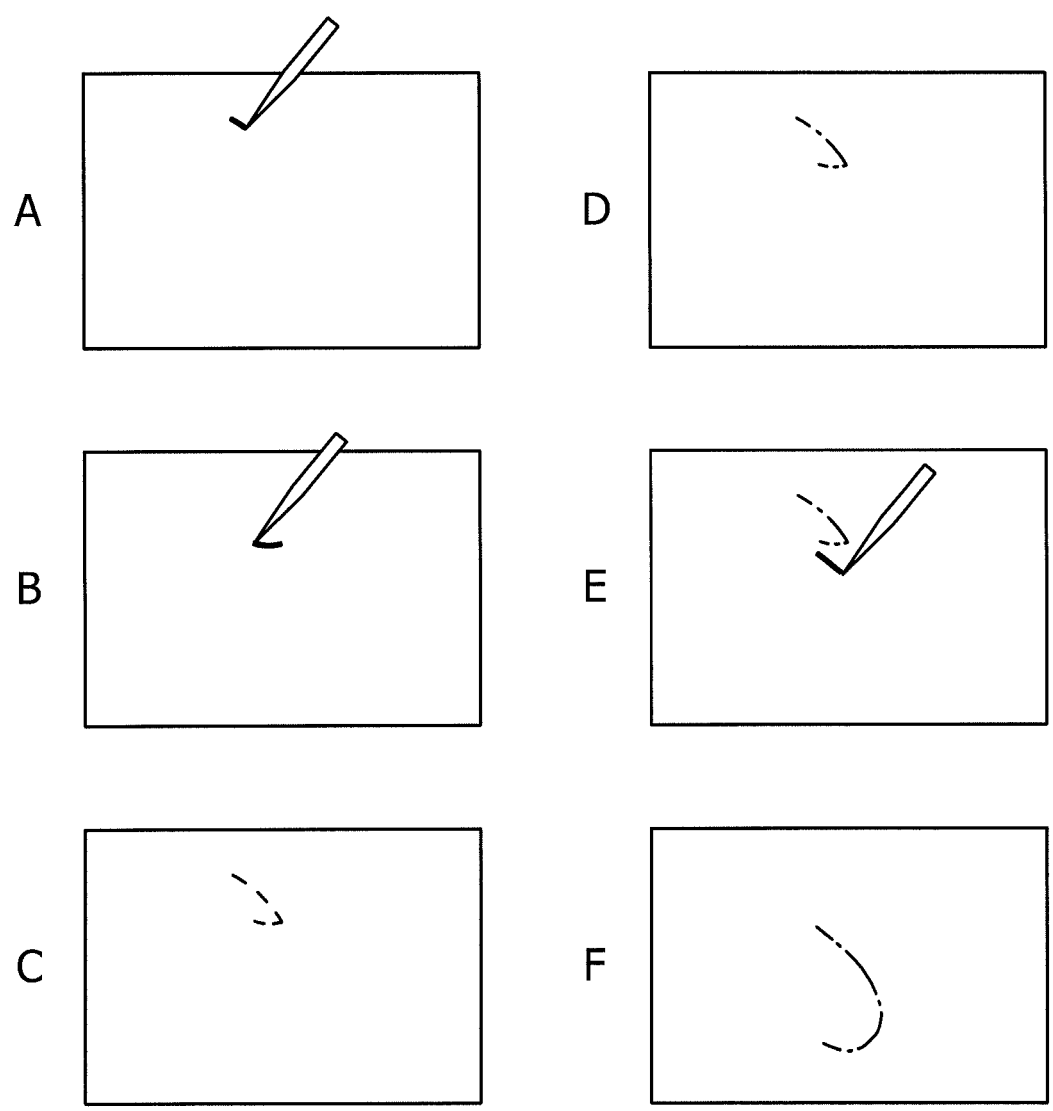
FIGS. 28A to 28F are explanatory diagrams illustrating the states of an exemplary input of the handwriting input device of the fourth embodiment.

FIGS. 28A to 28F illustrate the states of handwritten input of a certain Japanese character, respectively. FIG. 28A to FIG. 28C illustrate the same states as those shown in FIG. 24A to FIG. 24C of FIGS. 24A to 24F illustrating the third embodiment. FIG. 28D illustrates the state where the handwriting erased in FIG. 28C is represented by the trace-display color.

FIG. 28E represents a state when the reception of an input of a second stroke is started. Since the first trace is being displayed with the trace-display color, the input user can recognize the first handwriting. FIG. 28F shows a handwriting to be displayed with the trace-display color after completing the input of the second stroke and separating the input member from the handwriting input unit 13. Upon completing the input of the second stroke and separating the input member from the handwriting input unit 13, the first handwriting displayed with the trace-display color is eliminated. As a result, only the second handwriting is displayed with the trace-display color.

FIGS. 29A to 29F are explanatory diagrams illustrating the states of an exemplary input of the handwriting input device 1 of the fourth embodiment, respectively. Where the handwriting input device 1 is configured as an integrated combination of the handwriting input unit 13 and the display unit 14, FIGS. 29A to 29F illustrates handwriting and a stylus pen as an input member displayed on the display unit 14. In FIGS. 29A to 29F, the handwriting being displayed is represented by a solid line and the erased handwriting is represented by a dashed line. In addition, the handwriting being displayed with the trace-display color is represented by a dashed-dotted line.

Figure 29:
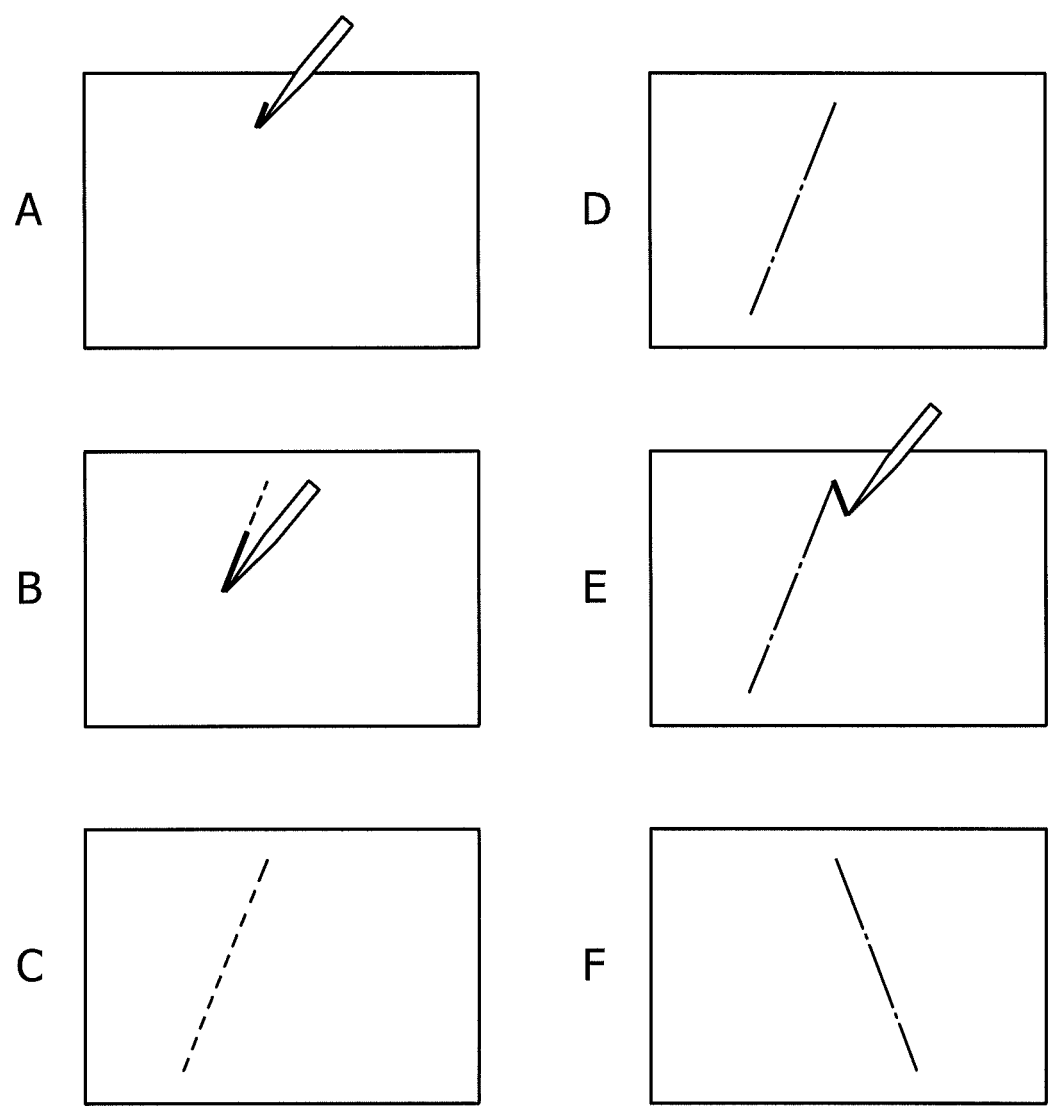
FIGS. 29A to 29F are explanatory diagrams illustrating the states of an exemplary input of the handwriting input device of the fourth embodiment.

FIGS. 29A to 29F show the states where the alphabetic letter "A" is written by hand, respectively. FIGS. 29A to 29C illustrate the same states as those shown in FIGS. 25A to 25C of FIGS. 25A to 25F illustrating the third embodiment, respectively. FIG. 29D illustrates the state where the handwriting erased in FIG. 29C is represented by the trace-display color.

FIG. 29E represents a state when the reception of an input of a second stroke is started. Since the first trace is being displayed with the trace-display color, the input user can recognize the first handwriting. FIG. 29F shows a handwriting to be displayed with the trace-display color after completing the input of the second stroke and separating the input member from the handwriting input unit 13. Upon completing the input of the second stroke and separating the input member from the handwriting input unit 13, the first handwriting displayed with the trace-display color is eliminated. As a result, only the second handwriting is displayed with the trace-display color.

Here, the method for displaying the erased handwriting with the trace-display color may be suitably selected from various methods, such as one by which the handwriting is displayed with the trace-display color upon the length of the handwriting exceeds a predetermined length.

As described above, in the fourth embodiment, as the processing for displaying and erasing handwriting, the circumscribed graphic form that circumscribes the erased handwriting is displayed. Therefore, there is an advantage in that the input user taking a cross look can visually confirm the handwriting represented by the trace display color. In addition, there is another advantage in that any of other persons viewing from a location more far than the input user can hardly visually recognize the handwriting being displayed with the trace-display color.

Fifth Embodiment

A fifth embodiment is designed to dynamically change the length of a handwriting, which can be used as a reference of erasing the handwriting. In the fifth embodiment, the same structural elements as those in the first embodiment are designated by the same reference numerals to refer to the first embodiment and their detail description will be omitted.

The hardware configuration of the handwriting input device 1 of the fifth embodiment is the same as that of the first embodiment, so that the description of the hardware configuration will be omitted while referring to the first embodiment.

Figure 30:
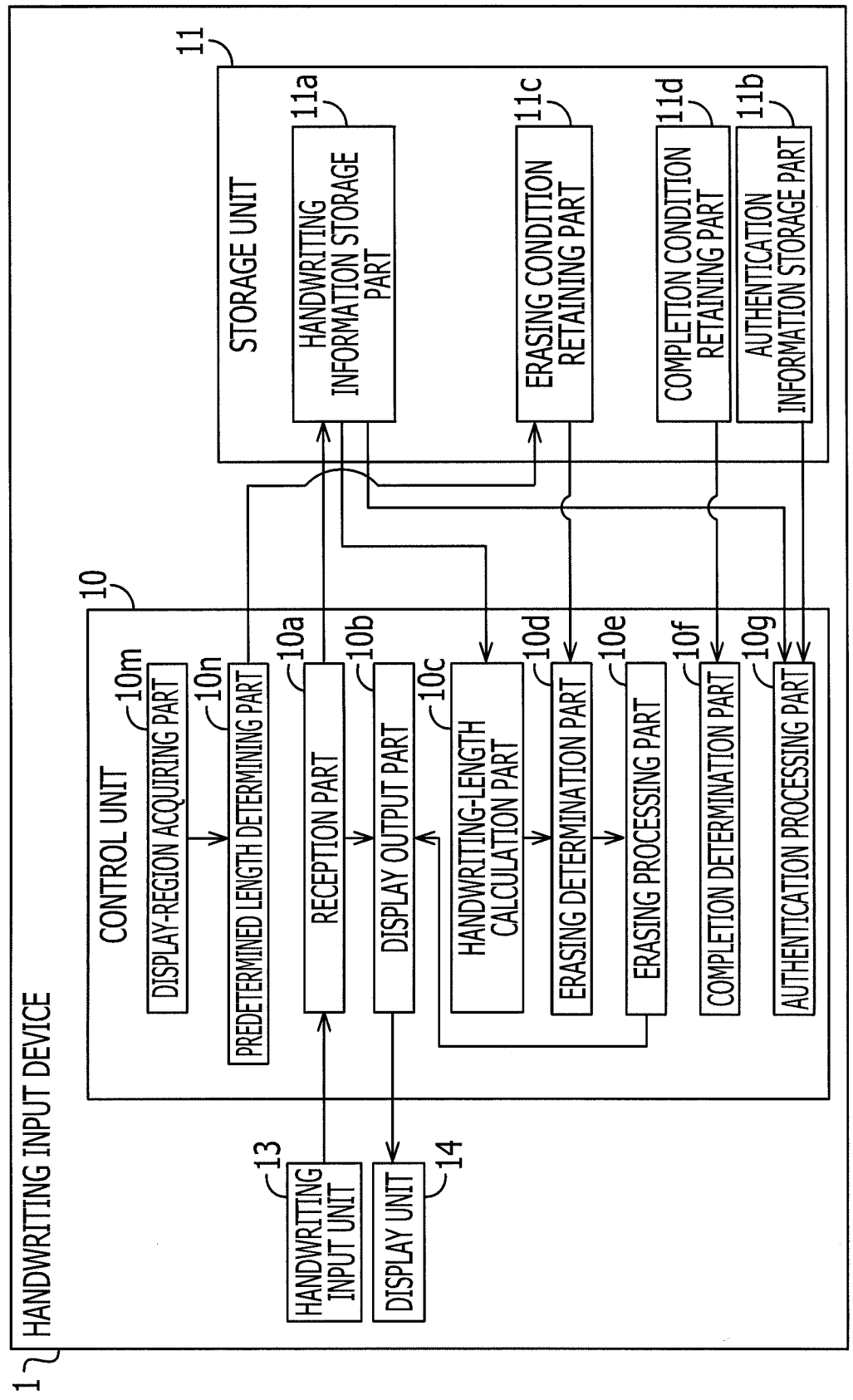
FIG. 30 is a block diagram illustrating an exemplary functional configuration of the handwriting input device according to a fifth embodiment.

Next, the functional constitution of the handwriting input device 1 according to the fifth embodiment will be described. FIG. 30 is a block diagram illustrating an exemplary functional configuration of the handwriting input device 1 according to the fifth embodiment. The handwriting input device 1 executes the handwritten input program PRG under the control of the control unit 10, thereby executing the functions of a reception unit 10a, a display output unit 10b, a handwriting-length calculation unit 10c, an erasing determination unit 10d, an erasing processing unit 10e, a completion determination unit 10f, an authentication processing unit 10g, a display-region acquiring unit 10m, a predetermined length determining unit 10n, and so on. Alternatively, in stead of executing the handwritten input program PRG, circuits that realize functions, such as those of the reception unit 10a, the display output unit 10b, the handwriting-length calculation unit 10c, the erasing determination unit 10d, the erasing processing unit 10e, the completion determination unit 10f, the authentication processing unit 10g, the display-region acquiring unit 10m, and the predetermined length determining unit 10n may be incorporated.

The display-region acquiring unit 10m is a structural element, such as a program module or a circuit, which activates the control unit 10 to acquire the length or size of the display region of the display unit 14.

On the basis of the length or size obtained by the display-region acquiring unit 10m, the predetermined length determining unit 10n is a structural element, such as a program module or a circuit, which activates the control unit 10 to determine a predetermined length which can be used as an erasing reference by the erasing processing unit 10e.

In addition, the handwriting input device 1 executes the handwritten input program RPG based on the control of the control unit 10 to allow the unit of the storage area of the storage unit 11 to be used as a handwriting information storage unit 11a, an authentication information storage unit 11b, an erasing condition retaining unit 11c, a completion condition retaining unit 11d, and so on.

Next, the processing of the handwriting input device 1 according to the fifth embodiment will be described. In the fifth embodiment, the processing for determining a predetermined length is performed before the processing for displaying and erasing handwriting. The processing for determining a predetermined length is processing that determines a predetermined length which is used as a reference for erasing the handwriting. In each of the first to fourth embodiments, the predetermined length is set as a fixed length. In the fifth embodiment, however, the predetermined length is set in a variable manner with reference to the length or size of the display of the display unit 14. For example, the fifth embodiment is applied to set the handwriting display region as a size-variable window in the handwriting input device 1 of the present application.

Figure 31:
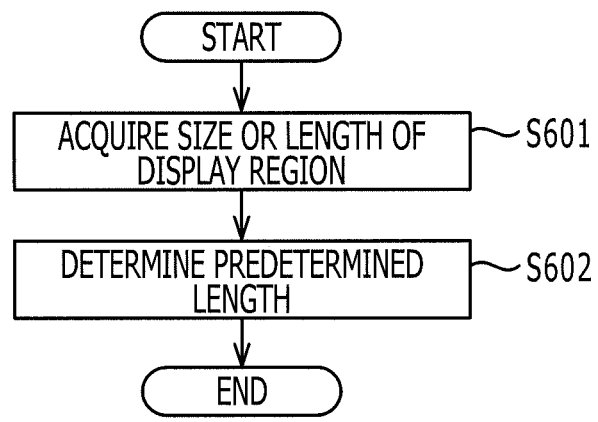
FIG. 31 is a flow chart illustrating an exemplary representation of prescribed length determination processing of the handwriting device according to the fifth embodiment.

FIG. 31 is a flow chart illustrating an example of the processing for determining a predetermined length of the handwriting input device 1 of the fifth embodiment. The handwriting input device 1 executes the processing for determining a predetermined length as described above when a window to be served as a handwriting display region on the display unit 14 or the size of the window being displayed is changed under the controls of the control unit 10 that executes the handwritten input program PRG.

The control unit 10 allows the display-region acquiring unit 10m to acquire the length or size of the handwriting display region displayed on the display unit 14 (S601). When the display region is of a square form, the length of the display region is the length of the long side of the square, the length of the short side of the square, the length of the diagonal line of the square. In addition, for example, if the display region is of a circular form, the length of the display region is the radius, diameter, or the like of the circle. If it is of an elliptic form, the length is the major axis, minor axis, or the like of the ellipse. For example, the size of the display region is an area (pixel number) of the display region.

The control unit 10 determines allows the predetermined length determining unit 10n to determine a predetermined length to be used as an erasing reference by the erasing processing unit 10e (S602). For example, the predetermined length may be determined as a one-sixth of the length of the short side. Alternatively, for example, the predetermined length may be determined as a one-tenth of the square root of the surface area of the display region. The predetermined length determined in S602 is recorded in the erasing condition retaining unit 11c. Accordingly, the processing for determining the predetermined length of the fifth embodiment can be executed. The processing for displaying and erasing handwriting of the fifth embodiment is the same as that of the first embodiment, so that the description of the description of such processing will be omitted while referring to the first embodiment.

Therefore, by determining the predetermined length according to the size of the display region, an appropriate predetermined length can be automatically defined. In addition, a concrete method for determining the predetermined length may be suitably selected from various methods, such as one that considers both the long side and the short side of the square or one that determines the upper or lower limit.

It is noted that the aforementioned first to fifth embodiments are only unit of uncountable number of embodiments of the present application and provided for illustrative purposes. The configuration of each of various kinds of hardware and software may be appropriately designed depending on the purpose, use, and so on. Furthermore, the first to fifth embodiments may be not performed independently from one another but suitably performed in combination depending on the purpose, use, and so on.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A handwriting input device, comprising:
a memory; and
a processor coupled to the memory, configured to:
accept an input of a handwriting, and
from among inputs accepted for the handwriting up to a present input point of the handwriting and prior to a complete condition for the input of the handwriting, control a display length for displaying the input handwriting from the starting input point of the handwriting to a present input point of the handwriting, by erasing from the displayed handwriting an excess display length which exceeds a predetermined display length for the handwriting during accepting the input for the handwriting, the excess display length to be erased is calculated from an erasing starting point serving as an origin for calculating the displayed handwriting length to an erasing end point at which the displayed handwriting length exceeds the predetermined display length, thereby the displayed handwriting not exceeding the predetermined display length,
wherein the complete condition for the input of the handwriting is determined upon detecting one or any combination of detecting separation of an input member used for inputting the handwriting from the handwriting input device, detecting input of a completion operation, or passage of a determined time.

2. A handwriting input device, comprising:
a memory; and
a processor coupled to the memory, configured to:
accept an input of a handwriting;
prior to a complete condition for the input of the handwriting execute:
control a display to display the input handwriting;
calculate a display length of the input handwriting which is being displayed on the display;
subtract a predetermined length from the display length of the displayed handwriting to obtain a remaining display length of the displayed handwriting, thereby a displayable length of the input handwriting not exceeding the predetermined length; and
erase the remaining display length from the displayed handwriting extending from an erasing starting point serving as an origin for calculating the display length of the displayed handwriting to an erasing end point at which the display length of the displayed handwriting exceeds the predetermined length,
wherein the complete condition for the input of the handwriting is determined upon detecting one or any combination of detecting separation of an input member used for inputting the handwriting from the handwriting input device, detecting input of a completion operation, or passage of a determined time.

3. The handwriting input device according to claim 2, wherein the displayed handwriting is erased when determined that the input of the handwriting is completed according to the complete condition.

4. The handwriting input device according to claim 2, wherein the processor is further configured to:
sample unit of points included in the erased displayed handwriting as trace points that represent a trace of the erased displayed handwriting; and
display the trace points sampled on the display.

5. The handwriting input device according to claim 4, wherein
a starting point and an ending point of the erased displayed handwriting are sampled as trace points and a point on the displayed handwriting which has a predetermined relationship with the starting and ending points of the erased displayed handwriting is sampled as a trace point.

6. The handwriting input device according to claim 4, wherein
a starting point and an ending point of the erased displayed handwriting are sampled as trace points and a point on the displayed handwriting, at which a distance from a line passing through the starting point and the ending point of the displayed handwriting is a maximum distance, is sampled as a trace point.

7. The handwriting input device according to claim 4, wherein the trace points sampled from the erased displayed handwriting corresponding to a last erased remaining display length from the displayed handwriting are displayed on the display.

8. The handwriting input device according to claim 2, wherein the processor is further configured to:
acquire a position of the erased displayed handwriting; and
display a circumscribed graphic form to circumscribe the erased displayed handwriting on the display.

9. The handwriting input device according to claim 8, wherein only a position where the displayed handwriting corresponding to a last erased remaining display length from the displayed handwriting has been displayed is acquired.

10. The handwriting input device according to claim 4, wherein
a background with a previously defined color and the displayed handwriting with a display color which is different from the color of the background are displayed on the display; and
the processor is further configured to provide the erased displayed handwriting with a trace-display color which is different from the color of the background and the display color, the trace-display color determined based on the color of the background.

11. The handwriting input device according to claim 10, wherein the trace-display color is an approximate color having a color difference and/or a brightness difference from the color of the background, where the color difference and/or the brightness difference is not more than a predetermined level.

12. The handwriting input device according to claim 10, wherein the erased displayed handwriting with the trace-display color corresponding to a last erased remaining display length from the displayed handwriting is displayed on the display.

13. The handwriting input device according to claim 2, wherein the processor is further configured to:
acquire a length and/or a size concerning a display area of the display; and
determine the predetermined length for use in erasure of the displayed handwriting based on the acquired length and/or the size of the display area.

14. A method to be executed by a handwriting input device, comprising:
accepting an input of a handwriting;
prior to a complete condition for the input of the handwriting execute:
calculating a display length of the accepted handwriting which is being displayed on a display;
subtracting a predetermined length from the display length of the displayed handwriting to obtain a remaining display length of the displayed handwriting, thereby a displayable length of the input handwriting not exceeding the predetermined length; and
erasing the remaining display length from the displayed handwriting extending from an erasing starting point serving as an origin for calculating the display length of the displayed handwriting to an erasing end point at which the display length of the displayed handwriting exceeds the predetermined length,
wherein the complete condition for the input of the handwriting is determined upon detecting one or any combination of detecting separation of an input member used for inputting the handwriting from the handwriting input device, detecting input of a completion operation, or passage of a determined time.

15. A non-transitory computer readable recording medium storing a program that causes a computer to execute a process comprising:
displaying an input handwriting on a display;
prior to a complete condition for the input of the handwriting execute:
calculating a display length of the input handwriting which is being displayed on the display;
subtracting a predetermined length from the display length of the displayed handwriting to obtain a remaining display length of the displayed handwriting, thereby a displayable length of the input handwriting not exceeding the predetermined length; and
erasing the remaining display length of the handwriting from the display length of the handwriting being displayed on the display from the displayed handwriting extending from an erasing starting point serving as an origin for calculating the display length of the displayed handwriting to an erasing end point at which the display length of the displayed handwriting exceeds the predetermined length,
wherein the complete condition for the input of the handwriting is determined upon detecting one or any combination of detecting separation of an input member used for inputting the handwriting, detecting input of a completion operation, or passage of a determined time.

* * * * *